(12) United States Patent
Miyako et al.

(10) Patent No.: US 12,203,750 B2
(45) Date of Patent: Jan. 21, 2025

(54) ROTATION ANGLE DETECTION DEVICE AND ROTATION ANGLE DETECTION METHOD

(71) Applicant: ALPS ALPINE CO., LTD., Tokyo (JP)

(72) Inventors: Ikuyasu Miyako, Miyagi (JP); Wataru Kimura, Miyagi (JP); Ryo Maeda, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 157 days.

(21) Appl. No.: 18/158,752

(22) Filed: Jan. 24, 2023

(65) Prior Publication Data

US 2023/0280151 A1 Sep. 7, 2023

(30) Foreign Application Priority Data

Mar. 1, 2022 (JP) ................................. 2022-030834

(51) Int. Cl.
*G01B 7/30* (2006.01)
*G01D 5/244* (2006.01)

(52) U.S. Cl.
CPC ............ *G01B 7/30* (2013.01); *G01D 5/24471* (2013.01)

(58) Field of Classification Search
None
See application file for complete search history.

(56) References Cited

U.S. PATENT DOCUMENTS

| 2015/0103449 A1* | 4/2015 | Son ..................... H02H 7/093 |
| | | 361/23 |
| 2020/0076336 A1* | 3/2020 | Miyako ................ H02P 7/0094 |
| 2021/0044228 A1* | 2/2021 | Forster ................... H02P 23/12 |

FOREIGN PATENT DOCUMENTS

JP 2011-109880 6/2011

* cited by examiner

*Primary Examiner* — Vincent Q Nguyen
(74) *Attorney, Agent, or Firm* — IPUSA, PLLC

(57) ABSTRACT

A rotation angle detection device includes a current meter that measures a current flowing in a direct current motor; a filter that extracts a ripple component from the current; a ripple detector that detects a ripple from a signal that has passed through the filter; and a rotation angle detector that detects a rotation angle of the direct current motor based on the number of ripples. The rotation angle detector measures an observation period based on consecutive ripples, calculates an estimation period between the consecutive ripples based on the observation period, determines whether the observation period is within a normal range based on the estimation period and the observation period, and in response to determining that the observation period is within the normal range and an immediately-previous observation period is outside the normal range, calculates a number of correction ripples CRN so as to correct the number of the ripples.

8 Claims, 18 Drawing Sheets

FIG.3B

| RIPPLE NUMBER | | #1 | #2 | #3 | #4 | #5 | #6 | #7 | #8 | #9 | #10 | #11 | #12 |
|---|---|---|---|---|---|---|---|---|---|---|---|---|---|
| OBSERVATION PERIOD $T(i)$ | UNIT: 100 $\mu$s | 15 | 14 | 8 | 6 | 14 | 15 | 14 | 15 | 14 | 14 | 29 | 14 |
| ESTIMATION PERIOD $Te(i)$ | UNIT: 100 $\mu$s | 14 | 14 | 14 | 14 | 14 | 14 | 14 | 14 | 14 | 14 | 14 | 14 |
| DIVERGENCE $D(i)$ | UNIT: % | 7.1 | 0.0 | 42.9 | 57.1 | 0.0 | 7.1 | 0.0 | 7.1 | 0.0 | 0.0 | 107 | 0.0 |
| NUMBER OF TRUE RIPPLES TRN | — | 1 | 1 | 1 | 1 | 1 | 1 | 1 | 1 | 1 | 1 | 2 | 1 |

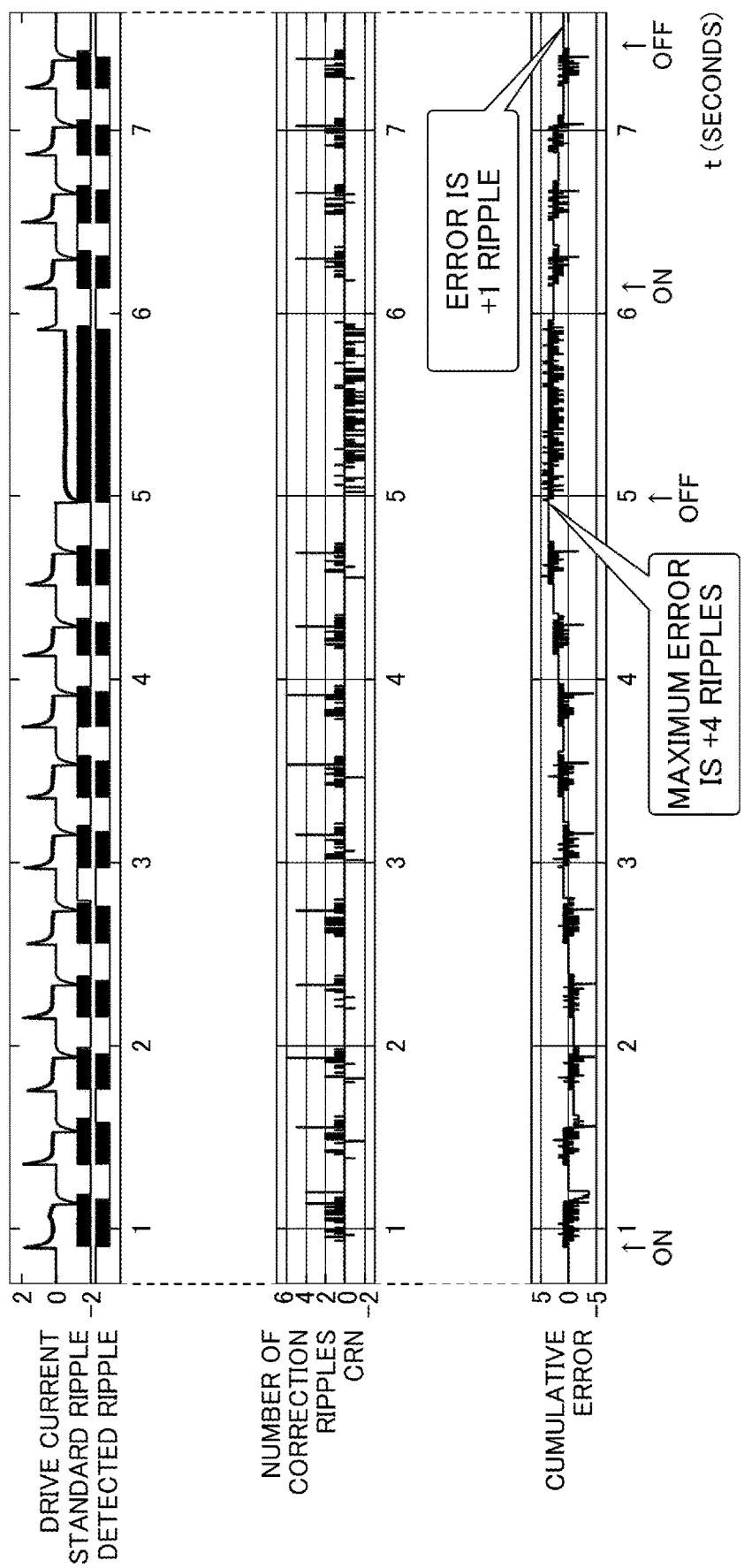

ROTATION ANGLE DETECTION DEVICE AND ROTATION ANGLE DETECTION METHOD

CROSS-REFERENCE TO RELATED APPLICATIONS

This application is based on and claims priority to Japanese Patent Application No. 2022-030834, filed on Mar. 1, 2022, the entire contents of which are incorporated herein by reference.

BACKGROUND OF THE INVENTION

1. Field of the Invention

The present disclosure relates to a rotation angle detection device and a rotation angle detection method.

2. Description of the Related Art

Conventionally, there is a rotation angle detection device that includes a variable cutoff frequency filter unit that extracts current ripples included in the armature current of a direct current motor and obtains a ripple waveform, a ripple period detecting unit that obtains ripple periods based on the ripple waveform, and a cutoff frequency control unit that controls the cutoff frequency of the filter unit based on the ripple periods. The ripple period detecting unit includes a ripple period calculation means that sequentially calculates the ripple periods based on the ripple waveform, an array creation/update means that creates and sequentially updates a time-series array of a fixed number of consecutive time-series ripple periods, which serve as array elements, an array element reordering means that reorders the ripple periods in the time-series array in order of length so as to create an array of the ripple periods in ascending order or in descending order, and a selection/calculation means that excludes a predetermined number of ripple periods located at the beginning or at the end of the array in ascending order or in descending order, calculates an average value of the remaining middle ripple periods, and defines the average value as an average ripple period. The cutoff frequency control unit controls the cutoff frequency of the filter unit based on the average ripple period.

The ripple period detecting unit includes at least one of a missed ripple correction means and a ripple increase correction means after the ripple period calculation means. If the latest ripple period is greater than a missed ripple determination value obtained by multiplying the average ripple period by a predetermined magnification of more than 1 and less than 2, the missed ripple correction means determines that missed detection of a current ripple occurs, that is, a current ripple fails to be detected. Then, the missed ripple correction means sends two missed ripple correction periods, obtained by dividing the latest ripple period by two, to the array creation/update means. If the latest ripple period is smaller than a ripple increase determination value obtained by multiplying the average ripple period by a predetermined magnification of less than 1, the ripple increase correction means determines that a ripple increase occurs, that is, noise indistinguishable from a current ripple is superimposed on the ripple waveform. Then, the ripple increase correction means sends, to the array creation/update means, a ripple increase correction period obtained by adding the latest ripple period and the next ripple period to be detected (See Patent Document 1, for example).

If a ripple increase (false detection of a ripple) occurs two or more times during one ripple period, that is, noise indistinguishable from a current ripple is superimposed on the ripple waveform two or more times during one ripple period, the conventional rotation angle detection device cannot accurately correct the false detection of the ripple. Therefore, the rotation angle of the direct current motor cannot be correctly detected. Further, if missed detection of a ripple occurs two or more times consecutively, that is, a current ripple of the ripple waveform fails to be detected two or more times consecutively, the conventional rotation angle detection device cannot accurately correct the missed detection of the ripple. Therefore, the rotation angle of the direct current motor cannot be correctly detected.

RELATED-ART DOCUMENTS

Patent Documents

Patent Document 1: Japanese Laid-open Patent Publication No. 2011-109880

SUMMARY OF THE INVENTION

It is desirable to provide a rotation angle detection device and a rotation angle detection method, in which the rotation angle of a direct current motor can be correctly detected even if false detection of ripples or missed detection of ripples occurs consecutively.

According to an embodiment of the present disclosure, a rotation angle detection device includes a current meter configured to measure a current flowing in a direct current motor; a filter configured to extract a ripple component from the current; a ripple detector configured to detect a ripple from a signal that has passed through the filter; and a rotation angle detector configured to detect a rotation angle of the direct current motor based on a number of ripples detected by the ripple detector. The rotation angle detector measures an observation period based on consecutive ripples detected by the ripple detector. The observation period is a period of time between the consecutive ripples. The rotation angle detector calculates, as an estimation period, a true period between the consecutive ripples based on the observation period, determines whether the observation period is within a normal range based on the estimation period and the observation period, and in response to determining that the observation period is within the normal range and an immediately-previous observation period is outside the normal range, calculates a number of correction ripples CRN so as to correct the number of the ripples based on an equation (1) below.

$$CRN = TRN - SN \qquad (1)$$

In the equation (1), TRN is a value obtained by dividing a sum of observation periods during an abnormal period of time, in which the observation periods are consecutively determined to be outside the normal range, by the estimation period. The TRN indicates an estimated number of ripples during the abnormal period of time. SN is a number of ripples detected by the ripple detector during the abnormal period of time in which the observation periods are consecutively determined to be outside the normal range.

BRIEF DESCRIPTION OF THE DRAWINGS

Other objects and further features of the present invention will be apparent from the following detailed description when read in conjunction with the accompanying drawings, in which:

FIG. 2 is a drawing illustrating changes in voltage, current, and ripples of a DC motor over time after the DC motor is turned on;

FIG. 3B is a table summarizing the operation of FIG. 3A;

FIG. 4A is a drawing illustrating a specific example of the number of detected ripples, correction values, and a cumulative error;

DESCRIPTION OF THE EMBODIMENTS

In the following, a rotation angle detection device and a rotation angle detection method according to embodiments of the present disclosure will be described.

EMBODIMENTS

Figure 1:
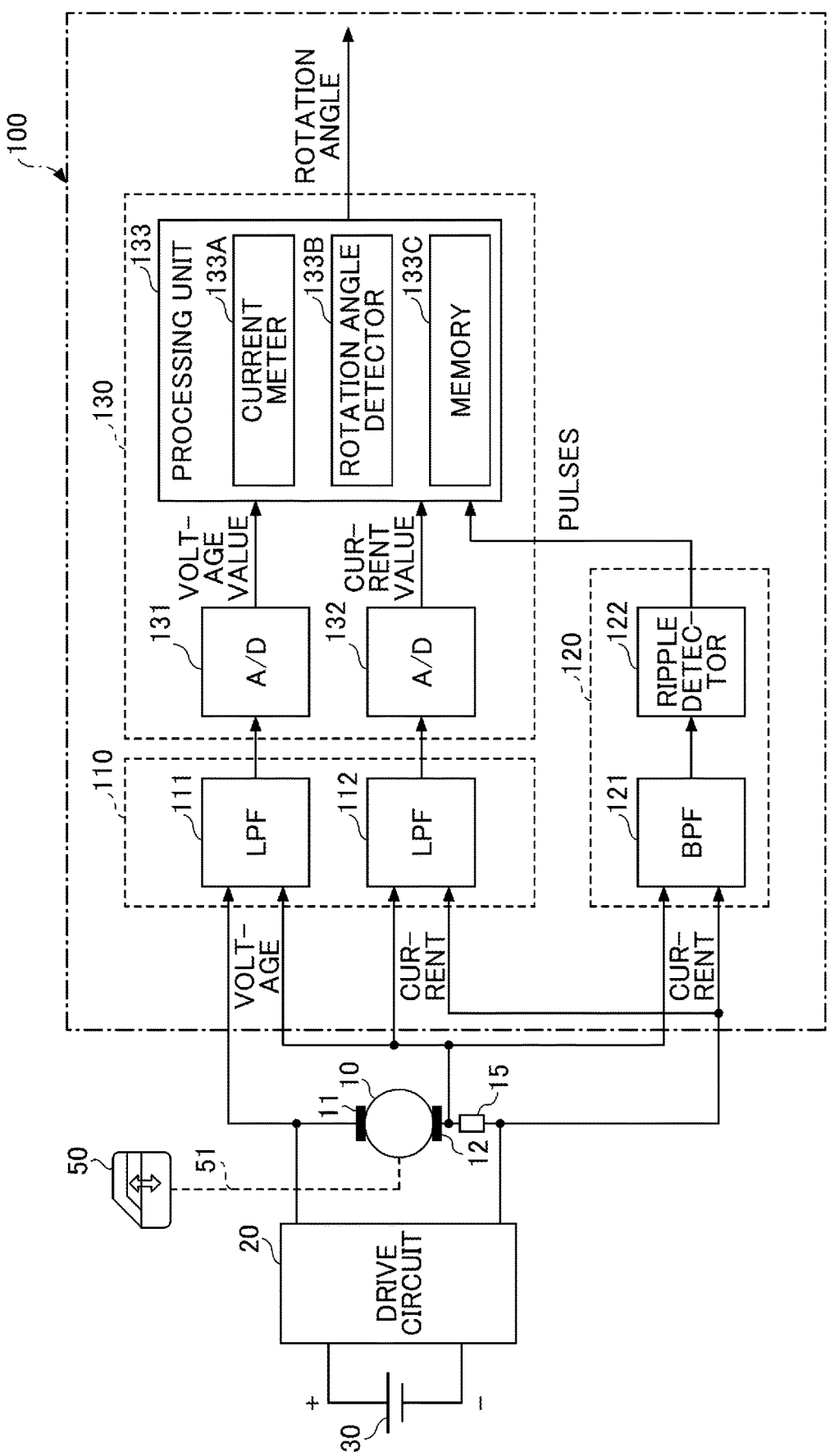
FIG. 1 is a drawing illustrating a rotation angle detection device according to an embodiment.

FIG. 1 is a drawing illustrating a rotation angle detection device 100 according to an embodiment. An electric motor, whose rotation angle is detected by the rotation angle detection device 100, is not limited an electric motor that drives a power window of a vehicle. However, in the following, a configuration in which the rotation angle detection device 100 is used as a device that detects the rotation angle of an electric motor for a power window will be described as an example.

FIG. 1 illustrates, in addition to the rotation angle detection device 100, a direct current (DC) motor 10, a resistor 15, a drive circuit 20, a DC power source 30, a power window 50, and a drive mechanism 51. The DC motor 10 is an example of a direct current motor.

The DC motor 10 includes terminals 11 and 12, and is driven by the drive circuit 20 connected to the terminals 11 and 12. The resistor 15 is connected to the terminal 12 of the DC motor 10, and is used to detect the current of the DC motor 10. The drive circuit 20 drives the DC motor 10 with DC power supplied from the DC power source 30. The drive circuit 20 drives the DC motor 10 as controlled by a drive controller (not illustrated). In FIG. 1, the drive controller is not depicted.

The power window 50 is a power window of a vehicle, and is opened or closed by a driving force transmitted from a rotor of the DC motor 10 via the drive mechanism 51. The drive mechanism 51 is a mechanical mechanism such as a regulator that is provided inside a door panel of the vehicle, and converts a rotational force of the rotor of the DC motor 10 into a vertical driving force of the power window 50.

The rotation angle detection device 100 includes a filter circuit 110, an integrated circuit (IC) chip 120, and a microcomputer 130.

The filter circuit 110 includes low-pass filters (LPF) 111 and 112. The voltage between the terminals 11 and 12 of the DC motor 10 is input into the LPF 111, and high-frequency noise and the like included in the voltage are removed and output to the microcomputer 130. The voltage between both ends of the resistor 15 is input into the LPF 112 as a voltage representing the current of the DC motor 10, and high-frequency noise and the like included in the voltage are removed and output to the microcomputer 130.

The IC chip 120 includes a band-pass filter (BPF) 121 and a ripple detector 122. The voltage between the both ends of the resistor 15 is input into the BPF 121 as a voltage representing the current of the DC motor 10, and high-frequency noise, low-frequency noise, and the like included in the voltage are removed and output to the ripple detector 122. The BPF 121 performs a filtering process for extracting a ripple component from the voltage representing the current of the DC motor 10. The ripple detector 122 performs a ripple detecting process for detecting ripples in data representing the current input from the BPF 121, converts the ripples into pulses, and outputs the pulses to the microcomputer 130.

The microcomputer 130 includes an analog-to-digital (A/D) converters 131 and 132 and a processing unit 133. The microcomputer 130 is implemented by a computer including a central processing unit (CPU), a random access memory (RAM), a read only memory (ROM), an input/output interface, an internal bus, and the like. The A/D converters 131 and 132 and the processing unit 133 are functions of a program executed by the microcomputer 130 and are represented as functional blocks.

The A/D converter 131 converts the output of the LPF 111 into a digital signal, and outputs the digital signal to the processing unit 133. The output of the LPF 111 represents the voltage of the DC motor 10. Therefore, the output of the A/D converter 131 is digital data representing the voltage value of the DC motor 10.

The A/D converter 132 converts the output of the LPF 112 into a digital signal, and outputs the digital signal to the processing unit 133. The output of the LPF 112 represents the current of the DC motor 10. Therefore, the output of the A/D converter 132 is digital data representing the current value of the DC motor 10.

The processing unit 133 includes a current meter 133A, a rotation angle detector 133B, and a memory 133C. The current meter 133A and the rotation angle detector 133B are functions of a program executed by the microcomputer 130 and are represented as functional blocks. The memory 133C is a memory of the microcomputer 130 and is represented as a functional block.

The current meter 133A performs a current measuring process for measuring a current flowing through the DC motor 10 based on the output of the A/D converter 132. The current meter 133A outputs data representing the measured current value to the rotation angle detector 133B.

The rotation angle detector 133B performs a rotation angle detecting process for calculating the rotation angle of the DC motor 10 based on the output (voltage value) of the A/D converter 131, the output (current value) of the current meter 133A, and a pulse (ripple) input from the ripple detector 122. The rotation angle of the rotor of the DC motor 10 is synonymous with the rotation angle of the DC motor 10.

In the rotation angle detecting process, the rotation angle detector 133B calculates an observation period of ripples and an estimation period based on pulses (ripples) input from the ripple detector 122. The observation period is a period of time from a time at which the immediately-previous ripple (i.e., a ripple that comes immediately before the ripple (latest ripple) subjected to the calculation of the observation period) is detected to a time at which the ripple (latest ripple) subjected to the calculation of the observation period is detected. The observation period is a period of time between two consecutive ripples. The estimation period is an estimated value of a true period obtained by eliminating the effect of measurement error from the observation period of ripples. For example, for the DC motor 10 in which a ripple occurs every 60 degrees, the estimation period is a period of time during which the DC motor 10 is assumed to rotate by 60 degrees. In addition to the above-described process, the rotation angle detector 133B performs processes illustrated in flowcharts of FIGS. 5A through 10. Details of the processes will be discussed later.

The memory 133C stores programs and data used when the current meter 133A and the rotation angle detector 133B perform processes, the output (voltage value) of the A/D converter 131, the output (current value) of the current meter 133A, pulse data input from the ripple detector 122, and the like.

<Voltage V, Current I, and Ripple RP of DC Motor 10>

Figure 2:
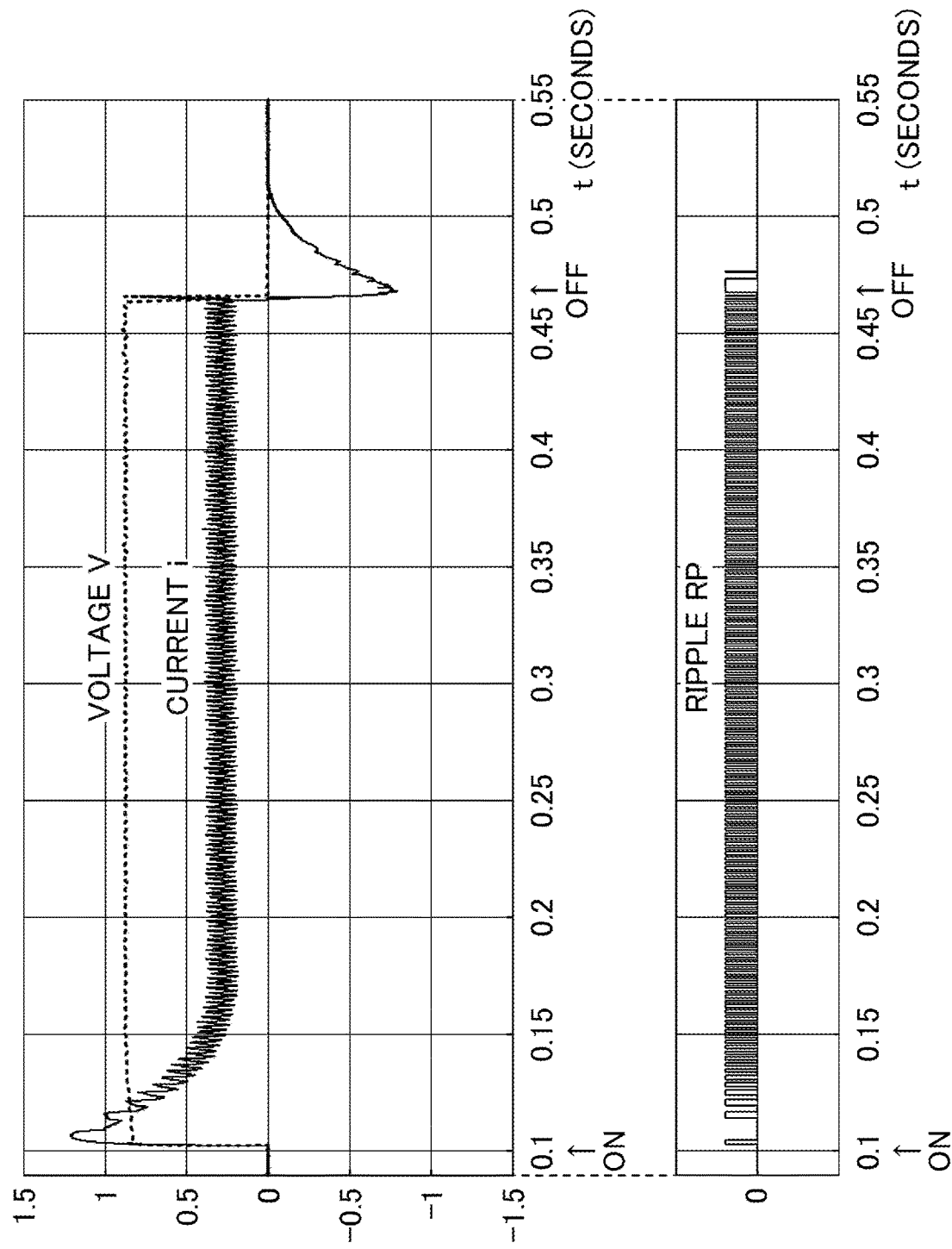

FIG. 2 is a drawing illustrating changes in voltage V, current i, and ripples RP of the DC motor 10 over time after the DC motor 10 is turned on. In FIG. 2, the horizontal axis indicates time t (seconds). The vertical axis indicates voltage values V, current values i, and normalized amplitude values (no unit) of ripples RP.

The voltage V is a voltage between the terminals 11 and 12 of the DC motor 10, and is a voltage input into the LPF 111. The current i is a current input from the DC motor 10 into the LPF 112. The ripples RP are ripple pulses obtained by detecting, by the ripple detector 122, ripples included in data representing the current input from the BPF 121, and converting the ripples into pulses.

In response to the DC motor 10 being turned on and the rotor starting to rotate when the time t is 0.1 seconds, the voltage V rises from 0V and the current i rises from 0 A. The voltage V is substantially constant at approximately 10 V as an example. The current i rises greatly immediately after the DC motor 10 is turned on and then attenuates. After the time t reaches about 0.17 seconds, and ripples are superimposed on a DC component of approximately 10 A. As described above, the value indicating the magnitude of the current i passing through the LPF 112 is input into the processing unit 133. Therefore, the value indicating the magnitude of the current i input into the processing unit 133 is substantially constant at approximately 10 A, excluding ripples and noise. For the ripples RP, the number of pulses gradually increases and the interval (period) between pulses gradually decreases from the time t of 0.1 seconds, at which the DC motor 10 is turned on, to about 0.13 seconds, and subsequently, the interval between pulses becomes almost constant.

In response to the DC motor 10 being turned off when the time t is about 0.47 seconds, the voltage V drops to 0 V, and the current i becomes 0 A when the time t is about 0.52 seconds after a negative current resulting from the back electromotive force flows. For the ripples RP, a small pulse occurs after the DC motor 10 is turned off because the DC motor 10 rotates slightly by inertia.

If a ripple RP is successfully detected by the ripple detector 122 while the DC motor 10 is rotating, the ripple RP corresponding to the rotation angle of the rotor of the DC motor 10 is generated, and the rotation angle of the rotor of the DC motor 10 is accurately detected by the rotation angle detector 133B. The rotation angle of the rotor is detected by counting the number of ripples RP.

However, if false detection occurs, that is, noise or the like is erroneously detected as a ripple RP by the ripple detector 122, or if missed detection occurs, that is, a ripple RP fails to be detected, a ripple RP corresponding to the rotation angle of the rotor of the DC motor 10 is not generated, and the rotation angle of the rotor of the DC motor 10 is not accurately detected by the rotation angle detector 133B. Noise erroneously detected as a ripple RP by the ripple detector 122 is noise that has passed through the BPF 121.

In the following, a method for accurately correcting the rotation angle of the rotor of the DC motor 10 and detecting an accurate rotation angle even if false detection or missed detection of a ripple occurs will be described. The rotation angle detection device 100 can accurately detect the rotation angle of the DC motor 10 even if false detection or missed detection of a ripple occurs consecutively.

<Method for Detecting Rotation Angle by Rotation Angle Detection Device 100>

Figure 3A:
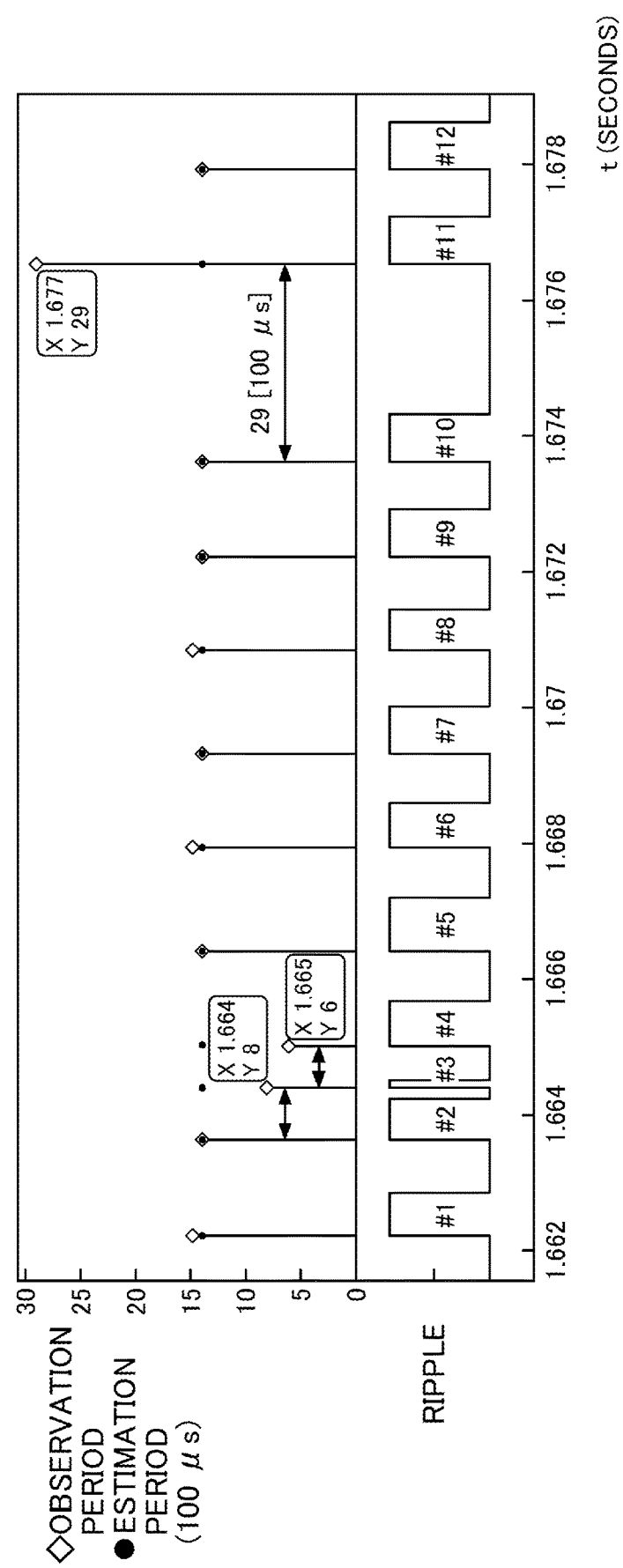
FIG. 3A is a drawing illustrating example observation periods of ripples.

FIG. 3A is a drawing illustrating example observation periods of ripples. In FIG. 3A, the horizontal axis indicates time t. On the upper side of FIG. 3A, the vertical axis indicates the length of an observation period and the length of an estimation period. The upper side of FIG. 3A depicts an observation period (diamond mark ◇) and an estimation period (black circle mark ●) at a timing at which a ripple is detected. An observation period is calculated each time a ripple is detected. Therefore, an observation period is a period of time from a time at which the immediately-previous ripple (i.e., a ripple that comes immediately before the ripple (latest ripple)) is detected to a time at which the latest ripple is detected. An estimation period is an estimated value of an observation period, estimated with respect to the latest ripple.

The lower side of FIG. 3A depicts a pulse rising at a time at which a ripple is detected. The pulse width of each pulse represents a period of time during which the current value of the DC motor exceeds a threshold and is detected as a ripple by the ripple detector 122. Ripple (Pulse) numbers 1 to 12 (#1 to #12) represent the order in which ripples are detected.

In the example illustrated in FIG. 3A, a ripple #3 is noise that is erroneously detected as a ripple. Therefore, the observation period of a ripple #3 is extremely shorter than the observation periods of the other ripples. If a ripple is erroneously detected as described above, the number of detected ripples becomes larger than the number of true ripples. In addition, missed detection of a ripple occurs between a ripple #10 and a ripple #11. Therefore, the observation period of the ripple #11 is extremely longer than the observation periods of the other ripples. If missed detection of a ripple occurs as described above, the number of detected ripples becomes smaller than the number of true ripples.

FIG. 3B is a table summarizing the operation of FIG. 3A. In FIG. 3B, for each of the ripples detected as the ripple numbers 1 to 12 (#1 to #12), an observation period T(i), an estimation period Te(i), a divergence D(i) (%), and the estimated number of ripples TRN are depicted. In FIG. 3B, i is #1 to #12. Note that (i) indicates a subscript of an array.

The divergence D(i) represents the level of divergence between the observation period T(i) and the estimation period Te(i), and is a value used as an index for determining whether the ith ripple is a correctly detected ripple. The divergence D(i) is expressed by the following equation (1). The rotation angle detector 133B calculates the divergence D(i).

[Equation 1]

$$D(i) = \frac{|T(i) - Te(i)|}{Te(i)} \quad (1)$$

The divergence D(i) is obtained by dividing the absolute value of the difference between the observation period T(i) and the estimation period Te(i) by the estimation period Te(i). If the divergence D(i) is less than or equal to a first threshold TH1, the ith ripple is a correctly detected ripple. If the divergence D(i) is greater than the first threshold TH1, the ith ripple is not a correctly detected ripple, and is considered as a false detection or a missed detection. The rotation angle detector 133B determines whether the divergence D(i) is less than or equal to the first threshold TH1. The first threshold TH1 is an example of a predetermined threshold.

If the divergence D(i) is less than or equal to the first threshold TH1, the rotation angle detector 133B determines that the observation period T is within a normal range. If the divergence D(i) is greater than the first threshold TH1, the rotation angle detector 133B determines that the observation period T is not within the normal range. The first threshold TH1 may be set according to the environment where the DC motor 10 is used. In general, the first threshold TH1 is in the range of approximately 20% to 30%. In the present embodiment, a configuration in which the first threshold TH1 is 25% will be described as an example. Further, in the following, a period of time in which the rotation angle detector 133B consecutively determines that the divergence D(i) is greater than the first threshold TH1 is referred to as an abnormal period of time. The abnormal period of time is a period of time in which observation periods T are consecutively determined to be outside the normal range.

The estimated number of ripples TRN can be calculated by the following equation (2). The rotation angle detector 133B calculates the estimated number of ripples TRN. The estimated number of ripples TRN is an estimated value of the number of true ripples during a period of time in which false detection of a ripple or missed detection of a ripple occurs. For example, for the DC motor 10 in which a ripple is generated every 60 degrees, the estimated number of ripples TRN is 1 when the DC motor 10 is assumed to be rotated by 60 degrees, and the estimated number of ripples TRN is 2 when the DC motor 10 is assumed to be rotated by 120 degrees.

[Equation 2]

$$TRN = \frac{\sum_{i=1}^{N} T(i)}{\sum_{i=1}^{N} Te(i)/SN} \quad (2)$$

The estimated number of ripples TRN is calculated by dividing the sum of observation periods T (the value of the numerator in the equation (2)) during an abnormal period of time, in which the observation periods T are consecutively determined to be outside the normal range, by an average value of estimation periods Te during the abnormal period of time (the value of the denominator in the equation (2)). In the equation (2), SN is the number of ripples detected by the ripple detector 122 during the abnormal period of time in which the observation periods T are consecutively determined to be outside the normal range by the rotation angle detector 133B.

An observation period T in which a ripple is successfully detected immediately after the abnormal period of time may be added to ΣT of the numerator in the equation (2). In this case, an estimation period Te in which the ripple is successfully detected immediately after the abnormal period of time may be added to ΣTe of the denominator in the equation (2), and also "1", which is the number of ripples successfully detected immediately after the abnormal period of time, may be added to SN. In this manner, the estimated number of ripples TRN can be calculated for a combined period of time that includes the abnormal period of time and an observation period T in which the ripple is successfully detected immediately after the abnormal period of time. The number of correction ripples CRN, which will be described later, is obtained by subtracting the number of detected ripples SN from the estimated number of ripples TRN. Therefore, the number of correction ripples CRN can be correctly calculated, as long as periods of time used to calculate the estimated number of ripples TRN coincide with periods of time used to measure the number of detected ripples SN.

For example, if values of estimation periods Te are continuously the same, the latest estimation period Te(i) may be used instead of the average value of the estimation periods Te(i) during the abnormal period of time, which is the value of the denominator in the equation (2).

As illustrated in FIG. 3B, each of the observation periods T of the correctly detected ripples #1 and #2, #5 to #10, and #12 among the ripples #1 to #12 is 1,400 µs or 1,500 µs, and the observation periods T(i) of the incorrectly detected ripples #3, #4, and #11 are 800 µs, 600 µs, and 2,900 µs, respectively. The estimation periods Te(i) of all of the ripples #1 to #12 are 1,400 µs.

The divergence D(i) calculated according to the equation (1) is less than or equal to the first threshold TH1 (25%) for the correctly detected ripples #1 to #2, #5 to #10, and #12, but is 42.9%, 57.1%, and 107% for the incorrectly detected ripples #3, #4, and #11, respectively, all being greater than the first threshold TH1 (25%).

The ripples #3 and #4 are in an abnormal period of time, and the estimated number of ripples TRN during this abnormal period of time is 1 according to the equation (2). Accordingly, the observation periods T of the ripples #3 and #4 should originally be one observation period, and the estimated number of ripples TRN can be calculated as 1.

The ripple #11 is in an abnormal period of time, and the estimated number of ripples TRN during this abnormal period of time is 2 according to the equation (2). Accordingly, the observation period T of the ripple #11 should originally be two observation periods, and the number of true ripples (estimated number of ripples TRN) can be calculated as 2.

By using the estimated number of ripples TRN during an abnormal period of time, the number of ripples during the abnormal period of time may be corrected. The rotation angle detector 133B uses the number of correction ripples CRN expressed by the following equation (3) to correct the number of ripples used to detect the rotation angle of the DC motor 10.

[Equation 3]

$$CRN = TRN - SN \quad (3)$$

The number of correction ripples CRN takes a negative value if the number of ripples detected by the ripple detector 122 during an abnormal period of time, in which false detection occurs and observation periods T are consecutively determined to be outside the normal range, is greater than the number of true ripples (the estimated number of ripples TRN). The number of correction ripples CRN takes a positive value if the number of ripples detected by the ripple detector 122 during a period of time, in which missed detection occurs and observation periods T(i) are consecutively determined to be outside the normal range, is less than the number of true ripples (the estimated number of ripples TRN).

<Specific Examples of Number of Detected Ripples, Number of Correction Ripples CRN, and Cumulative Error>

Figure 4B:
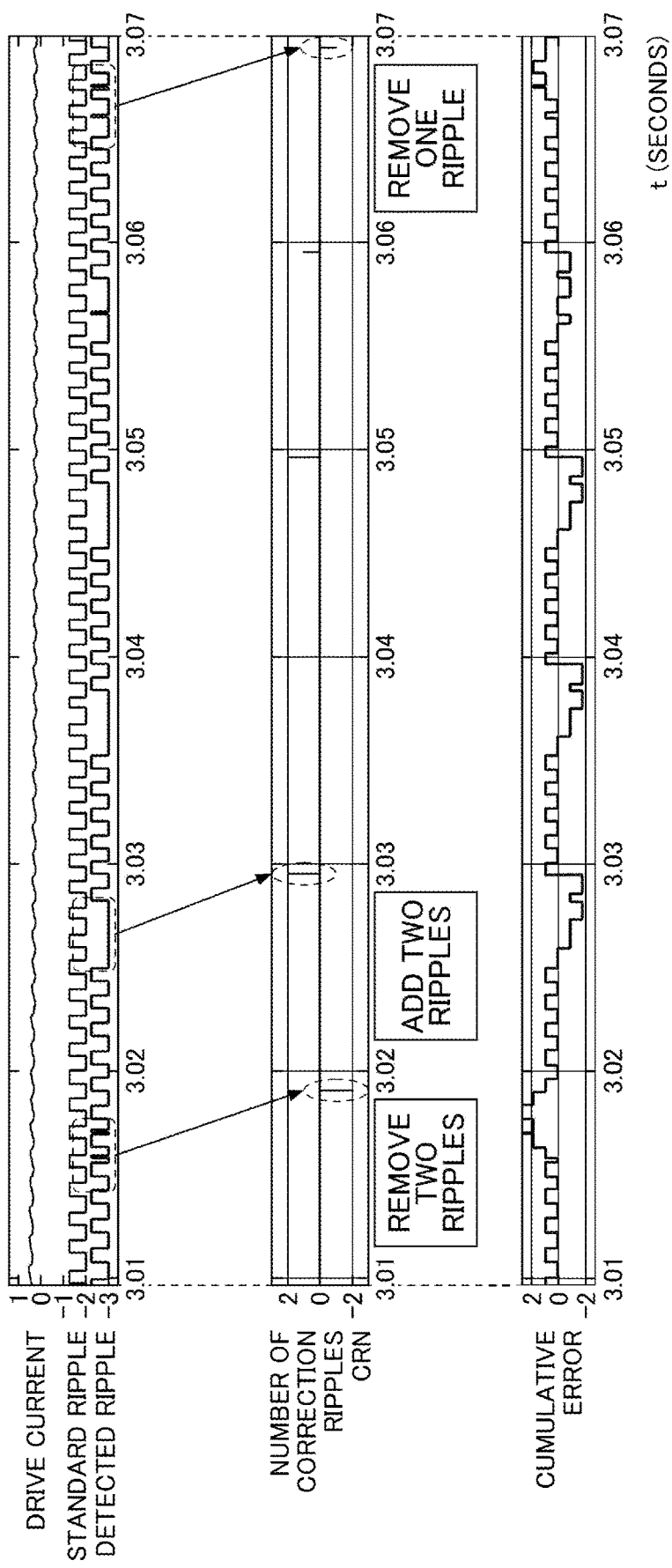
FIG. 4B is a drawing illustrating a specific example of the number of detected ripples, correction values, and the cumulative error.

FIGS. 4A and 4B are drawings illustrating specific examples of the number of detected ripples, the number of correction ripples CRN, and a cumulative error. In FIGS. 4A and 4B, the horizontal axis indicates time t (seconds). FIG. 4B is an enlarged view of a period of time from 3.01 seconds to 3.07 seconds of FIG. 4A. The values indicated in FIGS. 4A and 4B are obtained by simulation.

FIG. 4A illustrates, in order from top to bottom, a drive current, a standard ripple, a detected ripple, the number of correction ripples CRN, and a cumulative error. The same applies to FIG. 4B.

The drive current is a drive current of the DC motor 10. The standard ripple is not a ripple that is actually detected, but is a signal that is output when an angle, measured by an angle sensor attached to an experimental DC motor 10, is within a predetermined range. The standard ripple is configured to be output at a timing when a ripple is successfully detected. The standard ripple indicates a ripple that is successfully detected when the DC motor 10 is rotated. The standard ripple is indicated for comparison with a detected pulse.

The detected ripple is a ripple that is detected by the ripple detector 122. The number of correction ripples CRN indicates a value calculated for detected ripple(s). The number of correction ripples CRN as illustrated in FIGS. 4A and 4B is calculated according to the equation (3) by using standard ripples as the estimated number of ripples TRN. The cumulative error is an error in the number of ripples that could be cumulatively included in the rotation angle of the DC motor 10, which is ultimately detected after the rotation of the DC motor 10 is corrected by using the number of correction ripples CRN.

As illustrated in FIG. 4A, the DC motor 10 is turned on at about 0.7 seconds, and the drive current, the standard ripple, the detected ripple, the number of correction ripples CRN, and the cumulative error start to fluctuate. As illustrated in FIG. 4B, false detection of a ripple occurs twice consecutively between 3.01 seconds and 3.02 seconds, but the number of correction ripples CRN for removing two ripples is generated. In addition, missed detection of a ripple occurs twice consecutively between 3.02 seconds and 3.03 seconds, but the number of correction ripples CRN for adding two ripples is generated. In addition, the number of correction ripples CRN for removing one ripple is generated between 3.06 seconds and 3.07 seconds. In this manner, the rotation angle detector 133B detects the rotation angle of the DC motor 10 while calculating the numbers of correction ripples CRN.

As illustrated in FIG. 4A, the DC motor 10 is temporarily turned off and is stopped at about 5 seconds. The cumulative error at this point is +4 ripples, which is the maximum value. After about 6 seconds, the DC motor 10 is turned on again and is turned off at about 7.5 seconds. When the DC motor is driven in this manner, the final cumulative error is +1 ripple. Accordingly, it can be confirmed that the rotation angle of the DC motor 10 can be detected with very high accuracy.

As described above, the rotation angle of the DC motor 10 can be correctly detected even if false detection or missed detection of a ripple occurs consecutively, as in the above cases where the false detection occurs twice consecutively between 3.01 seconds and 3.02 seconds and the missed detection occurs twice consecutively between 3.02 seconds and 3.03 seconds.

<Flowchart>

Figure 5A:
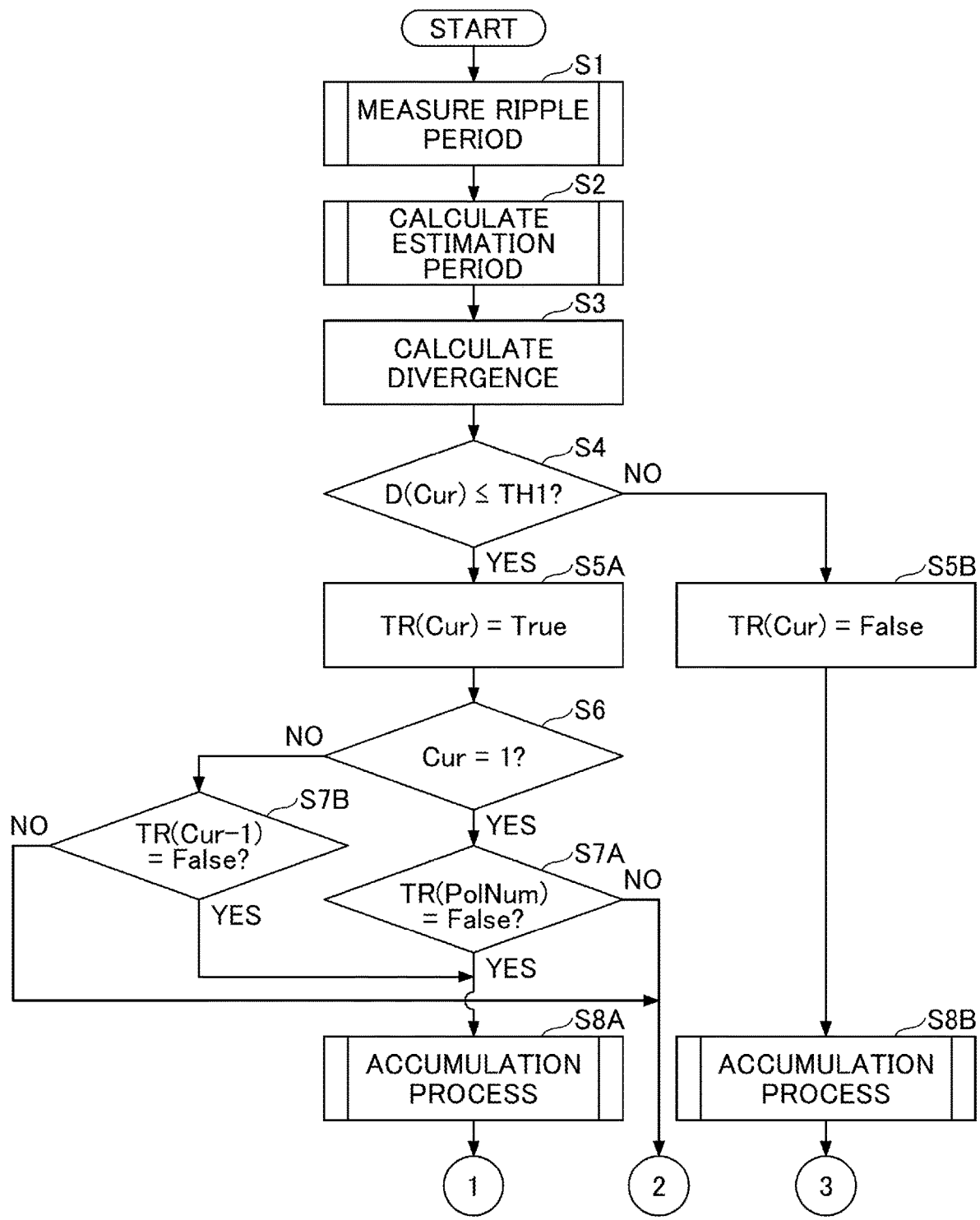
FIG. 5A is a flowchart illustrating an example of a process for detecting the rotation angle of the DC motor performed by a rotation angle detector.
Figure 5B:
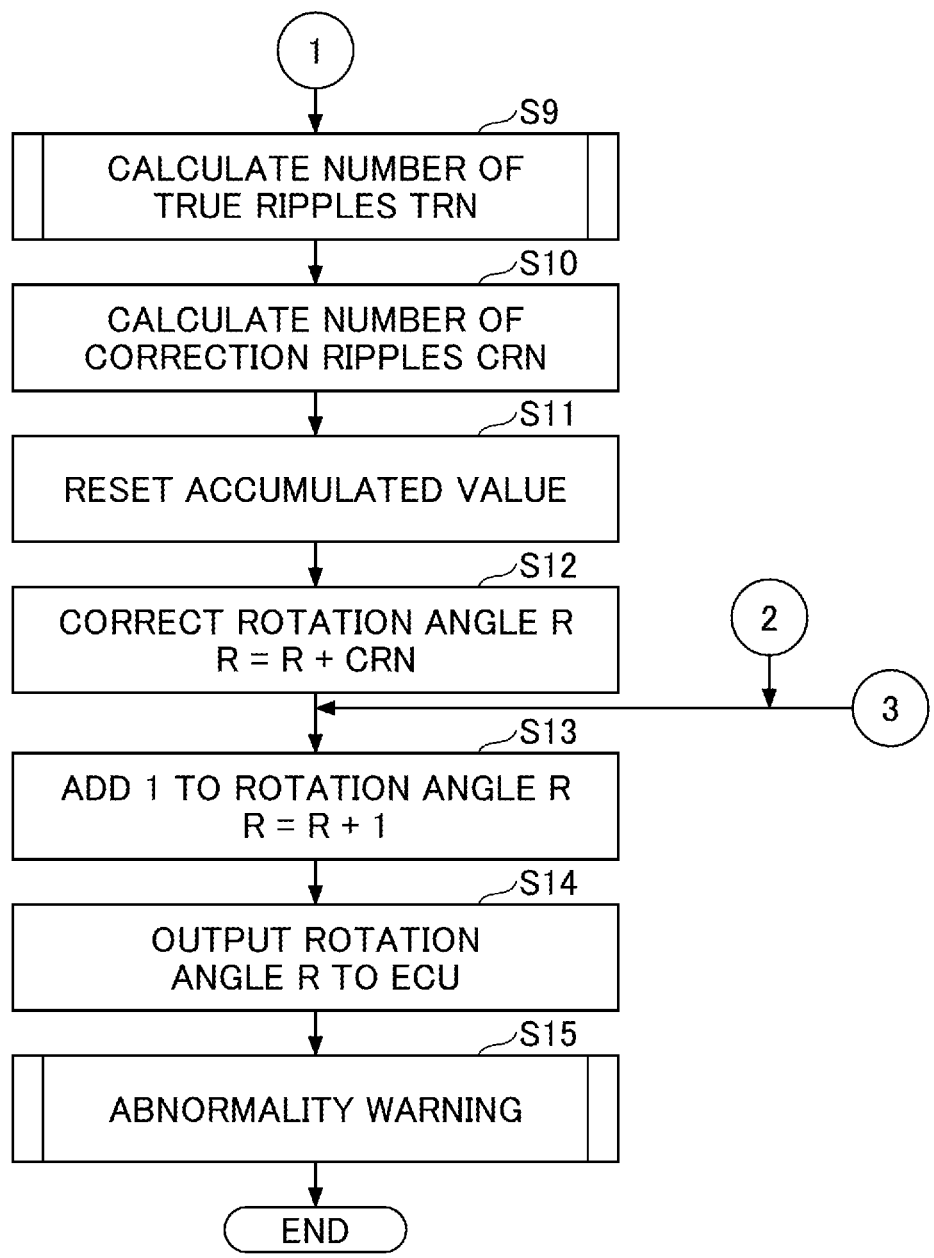
FIG. 5B is the flowchart illustrating the example of the process for detecting the rotation angle of the DC motor performed by the rotation angle detector.

FIGS. 5A and 5B are a flowchart illustrating a process for detecting the rotation angle of the DC motor 10 performed by the rotation angle detector 133B. The rotation angle detector 133B repeatedly performs the process illustrated in FIGS. 5A and 5B for each period in which a ripple is detected.

The rotation angle detector 133B measures a ripple period (step S1). The ripple period measured in step S1 is an observation period T(i). The observation period T(i) is a period of time from a time at which the immediately-previous ripple (i.e., a ripple that comes immediately before the ripple (latest ripple)) is detected to a time at which the latest ripple is detected. Step S1 is a subroutine process, which will be described later in detail with reference to FIG. 6.

The rotation angle detector 133B calculates an estimation period Te(Cur) (step S2). Step S2 is a subroutine process, which will be described later in detail with reference to FIG. 7. Cur is a value indicating a generation. Cur corresponds to a generation of the observation period T measured in step S1 before step S2 and also corresponds to the ripple number i in the equations (1) and (2). In the following, Cur is used instead of the ripple number i. Cur is a cyclical value and Cur is described as taking a value of 1 to 9, for example.

The rotation angle detector 133B calculates the divergence D(Cur) based on the equation (1) (step S3). The equation (1) is expressed by the following equation (4) using Cur.

[Equation 4]

$$D(Cur) = \frac{|T(Cur) - Te(Cur)|}{Te(Cur)} \quad (4)$$

The rotation angle detector 133B determines whether the divergence D(Cur) is less than or equal to the first threshold TH1 (D≤TH1) (step S4).

If the rotation angle detector 133B determines that the divergence D(Cur) is less than or equal to the first threshold TH1 (YES in S4), the rotation angle detector 133B sets a determination result TR(Cur) as to whether the ripple is correct to True (step S5A). That is, TR(Cur)=True.

The rotation angle detector 133B determines whether Cur is 1 (Cur=1) (step S6).

If the rotation angle detector 133B determines that Cur=1 (Yes in S6), the rotation angle detector 133B determines whether TR(PolNum)=False (step S7A). PolNum is the maximum value of Cur, and in the present embodiment, PolNum is, for example, 9. Step S7A is a process for determining whether a determination result TR of the previous generation is False. Cur is a cyclical value and takes a value of 1 to 9. Therefore, if Cur=1, the determination result of the previous generation determined in step S7A is a determination result TR (TR(PolNum)) of a generation of Cur=PolNum.

If rotation angle detector 133B determines that TR(PolNum) is False (Yes in S7A), the rotation angle detector 133B performs an accumulation process (step S8A). The accumulation process in step S8A is a subroutine process for accumulating the number of ripples SN during an abnormal period of time in which observation periods T are consecutively determined to be outside the normal range, the accumulated value ΣT(i) of the observation periods T(i) during the abnormal period of time, and the accumulated value ΣTe(i) of estimation periods Te(i) during the abnormal period of time. Details of the subroutine process of step S8A will be described later with reference to FIG. 8. When step S8A ends, the rotation angle detector 133B causes the flow to proceed to step S9.

If rotation angle detector 133B determines that TR(PolNum) is not False in S7A (NO in S7A), the rotation angle detector 133B causes the flow to proceed to step S13. If the answer in step S4 is YES and the answer in step S7A is NO, it means that observation periods T are consecutively within the normal range. Therefore, if the answer in step S7A is NO, the accumulation process and the like are not performed.

If the rotation angle detector 133B determines that Cur is not 1 in step S6 (NO in S6), the rotation angle detector 133B determines whether TR(Cur−1)=False (step S7B). Cur−1 represents the generation immediately-previous to the current Cur. Step S7B is a process for determining whether TR(Cur−1), which is a determination result of the immediately-previous generation, is False.

If the rotation angle detector 133B determines that TR(Cur−1) is False (YES in S7B), the rotation angle detector 133B causes the flow to proceed to step S8A. If the rotation angle detector 133B determines that TR(Cur−1) is not False (NO in S7B), the rotation angle detector 133B causes the flow to proceed to step S13. If the answer in step S4 is YES and the answer in step S7B is NO, it means that observation periods T (Cur) are consecutively within the normal range. Therefore, if the answer in step S7B is NO, the accumulation process and the like are not performed.

Following step S8A, the rotation angle detector 133B calculates the estimated number of ripples TRN (step S9). If it is determined that the divergence D(Cur) is less than or equal to the first threshold TH1 in step S4 (YES in S4) after false detection or missed detection of a ripple occurs in the previous generation, the estimated number of ripples TRN can be calculated according to the equation (2) because the observation period of the latest ripple has returned to the normal range for the first time since the previous generation. Prior to step S9, Σ of the numerator and Σ of the denominator in the equation (2) are calculated in the accumulation process of step S8A. Step S9 is a subroutine process, and will be described later in detail with reference to FIG. 9.

The rotation angle detector 133B uses the estimated number of ripples TRN calculated in step S9 and the number of ripples SN during the abnormal period of time to calculate the number of correction ripples CRN according to the equation (3) (step S10). The equation (3) is CRN=TRN−SN.

The rotation angle detector 133B resets a value accumulated in the accumulation process of step S8A (step S11). In step S11, the number of ripples SN during the abnormal period of time, the accumulated value ΣT(i) of the observation periods T(i), and the accumulated value ΣTe(i) of the estimation periods Te(i), which are accumulated in the accumulation process of step S8A, are reset to zero.

The rotation angle detector 133B corrects a rotation angle R of the DC motor 10 by adding the number of correction ripples CRN to the rotation angle R of the DC motor 10 (step S12). That is, R=R+CRN. The rotation angle R is an angle expressed in units of ripple occurrence intervals. For example, for a three-phase and six-slot DC motor, the rotation angle R of 1 corresponds to 60 degrees or π/3 radians. For an electric motor for a power window, the rotation angle R is used as position data of the power window.

The rotation angle detector 133B adds 1 to the rotation angle R (step S13). That is, the rotation angle R=R+1. One ripple is detected while the process illustrated FIGS. 5A and 5B is performed, and thus, 1 corresponding to the one ripple is added to the rotation angle R.

The rotation angle detector 133B outputs the rotation angle R to an electric control unit (ECU) that controls the power window 50 of the vehicle (step S14).

The rotation angle detector 133B performs an abnormality warning process (step S15). The process in step S15 is a subroutine process, and will be described later in detail with reference to FIG. 10.

If the rotation angle detector 133B determines that the divergence D(Cur) is not less than or equal to the first threshold TH1 in in step S4 (NO in S4), the rotation angle detector 133B sets the determination result TR(Cur) as to whether the ripple is correct to False (step S5B). That is, TR(Cur)=False. When step S5B ends, the rotation angle detector 133B causes the flow to proceed to step S8B.

The rotation angle detector 133B performs the accumulation process (step S8B). Similar to step S8A, the accumulation process in step S8B is a subroutine process for accumulating the number of ripples SN, the accumulated value ΣT(i) of observation periods T(i), and the accumulated value ΣTe(i) of estimation periods Te(i) during an abnormal period of time. Details of the subroutine process in step S8B are the same as those of step S8A, and will be described later with reference to FIG. 8. When step S8B ends, the rotation angle detector 133B causes the flow to proceed to step S13. If the flow goes through step S5B, the divergence D(Cur) is large and false detection or missed detection of a ripple has occurred. In this case, since the estimated number of ripples TRN is not immediately calculated, the flow proceeds to step S13 after the accumulation process is performed in step 8B.

Figure 6:
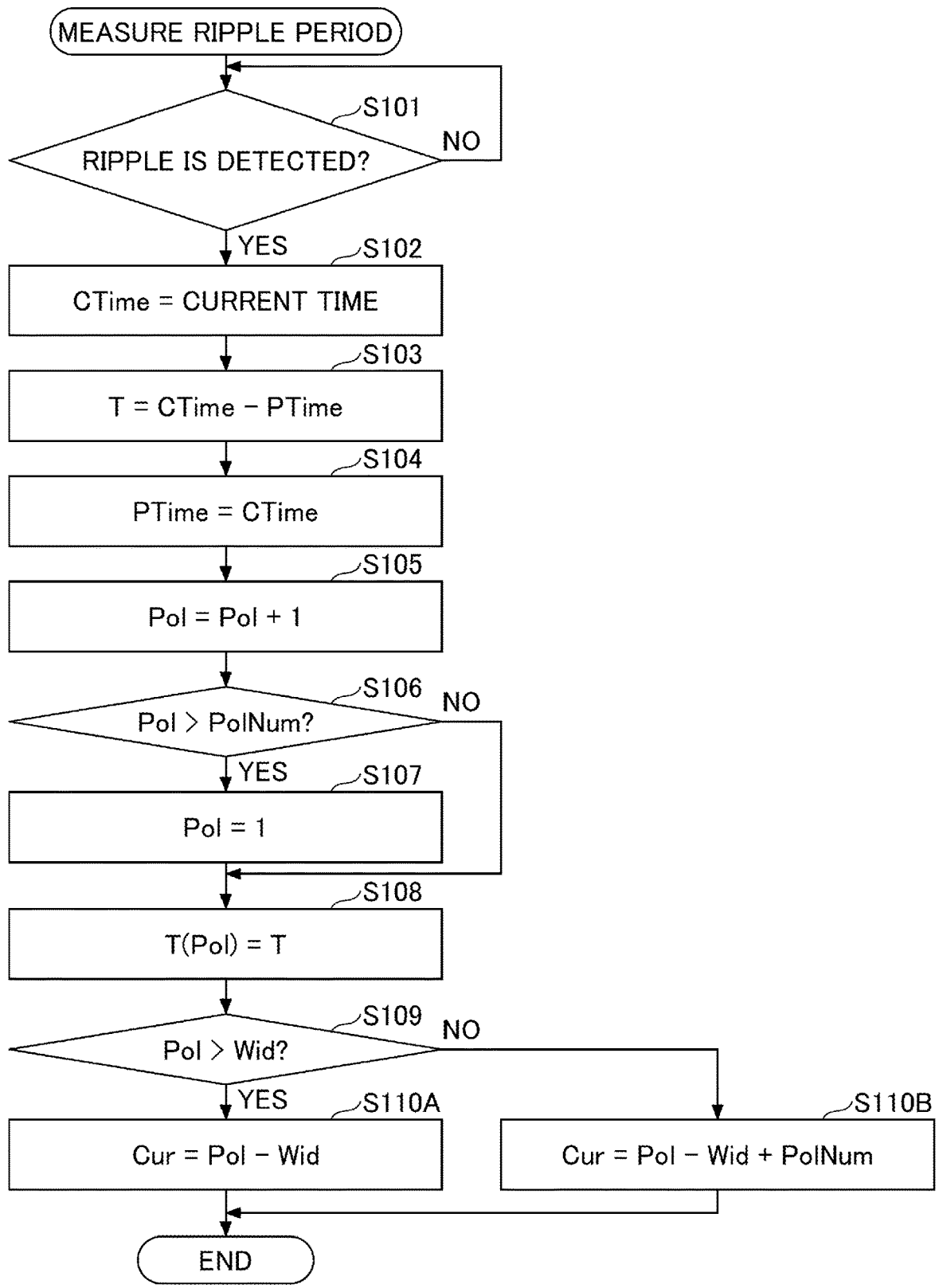
FIG. 6 is a flowchart illustrating an example of a ripple period measurement process.

Next, a ripple period measurement process, which is a process for measuring an observation period T, will be described with reference to FIG. 6. FIG. 6 is a flowchart illustrating an example of the ripple period measurement process.

The rotation angle detector 133B determines whether a ripple is detected by the ripple detector 122 (step S101). If the rotation angle detector 133B determines that a ripple is not detected (NO in S101), the rotation angle detector 133B repeatedly performs step S101 until a ripple is detected.

If the rotation angle detector 133B determines that a ripple is detected (YES in S101), the rotation angle detector 133B sets a time CTime (Current Time) at which the latest ripple is detected to the current time (step S102).

The rotation angle detector 133B measures the latest observation period T by subtracting a time PTime (Previous Time) at which the previous ripple is detected from the time CTime at which the latest ripple is detected (step S103). The latest observation period T is the latest ripple period. That is, T=CTime−PTime.

The rotation angle detector 133B sets the time PTime to the time CTime to be used in the next control period (step S104). That is, PTime=CTime.

The rotation angle detector 133B increments Pol that represents a generation of an array A in which the past measurement periods T of respective generations are stored (step S105). That is, Pol=Pol+1. The array A is composed of, for example, a ring buffer, and holds a predetermined number of generations of measurement periods T(i). Therefore, the oldest measurement period T(i) of the oldest generation included in the array A is deleted when the latest measurement period T is added. As described, by adding the latest measurement period T, the generation Pol of the array A advances by one, and thus, Pol is incremented in step S105. The generation Pol of the array A, in which the measurement periods T of the respective generations are stored, is a cyclical value, and the maximum value is PolNum.

The rotation angle detector 133B determines whether the generation Pol of the array A exceeds PolNum (step S106). That is, the rotation angle detector 133B determines whether Pol>PolNum.

If the rotation angle detector 133B determines that the generation Pol of the array A exceeds PolNum (YES in S106), the rotation angle detector 133B sets the generation Pol of the array A to 1 (step S107). That is, Pol=1. When step S107 ends, the rotation angle detector 133B causes the flow to proceed to step S108.

If the rotation angle detector 133B determines that the generation Pol of the array A does not exceed PolNum in S106 (NO in S106), the rotation angle detector 133B causes the flow to proceed to step S108.

The rotation angle detector 133B sets an observation period T(Pol) of the generation Pol to the latest observation period T calculated in step S103 (step S108). That is, T(Pol)=T.

The rotation angle detector 133B determines whether the value of the generation Pol is greater than Wid (step S109). That is, the rotation angle detector 133B determines whether Pol>Wid.

If the rotation angle detector 133B determines that the value of the generation Pol is greater than Wid (YES in S109), the rotation angle detector 133B sets Cur to Pol−Wid (step S110A). That is, Cur=Pol−Wid. A measurement period T(i) of a slightly earlier generation is used. In the calculation of an estimation period illustrated in FIG. 7, which will be described later, values before and after Cur are used. Therefore, if the median of nine measurement periods T(i) is used as an estimation period, Wid is set to 4 such that four values before Cur and four values after Cur can be used.

If the rotation angle detector 133B determines that the value of the generation Pol is not greater than Wid in S109 (NO in S109), the rotation angle detector 133B sets Cur to Pol−Wid+PolNum (step S110B). That is, Cur=Pol−Wid+PolNum. A measurement period T of a slightly earlier generation is used.

The ripple period measurement process, which is the subroutine process, illustrated in FIG. 6 ends.

Figure 7:
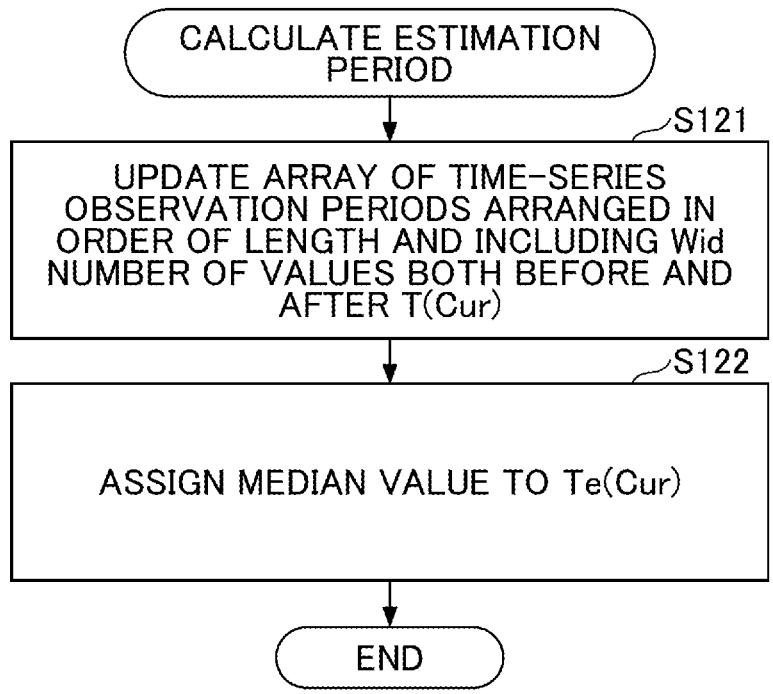
FIG. 7 is a flowchart illustrating an example of an estimation period calculation process.

Next, an estimation period calculation process for calculating an estimation period Te will be described with reference to FIG. 7. FIG. 7 is a flowchart illustrating an example of the estimation period calculation process.

The rotation angle detector 133B updates an array of time-series observation periods T(i) arranged in order of length and including the Wid number of values both before and after T(Cur) (step S121). For example, if the value of the Wid is 4, there is an array of nine observation periods T arranged in order of length and including four values both before and after the observation period T(Cur). Among the nine observation periods T, the oldest generation of the observation period T(i) is overwritten by the latest observation period (Pol). Then, the observation periods T are rearranged in order of length.

The rotation angle detector 133B assigns the median of the observation periods T, included in the array updated in step S121, to an estimation period Te(Cur) (step S122). By performing step S122, the median of the array of the time-series observation periods arranged in order of length and including the Wid number of values both before and after the observation period T(Cur), which is updated in step S121, is assigned to the estimation period Te(Cur). For example, as described above, in the array of the nine observation periods T arranged in order of length, the value of the fifth longest observation period is assigned to the estimation period Te(Cur).

The estimation period calculation process, which is the subroutine process, illustrated in FIG. 7 ends.

Figure 8:
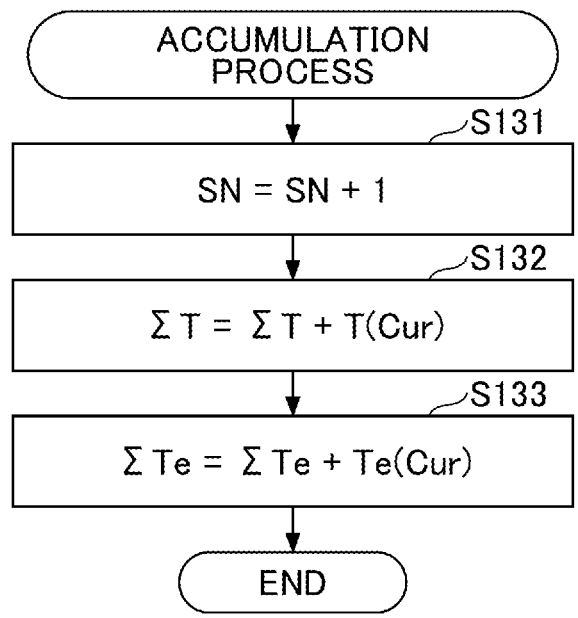
FIG. 8 is a flowchart illustrating an example of an accumulation process.

Next, the accumulation process is described with reference to FIG. 8. FIG. 8 is a flowchart illustrating an example of the accumulation process. The accumulation process illustrated in FIG. 8 is the subroutine process performed in steps S8A and S8B.

The rotation angle detector 133B increments SN (step S131). That is, SN=SN+1. SN denotes the number of ripples detected during an abnormal period of time.

The rotation angle detector 133B adds the observation period T(Cur) to the accumulated value $\Sigma T$ of the observation periods T (step S132). That is, $\Sigma T=\Sigma T+T(Cur)$. The latest estimation period Te(Cur) is an estimation period Te(Cur) of the Wid number of (for example, four) generations earlier. Therefore, an observation period of the Wid number of generations before the latest observation period T(Pol) is used as the observation period T(Cur).

The rotation angle detector 133B adds the latest estimation period Te(Cur) to the accumulated value $\Sigma Te$ of estimation periods Te (step S133). That is, $\Sigma Te=\Sigma Te+Te(Cur)$.

The accumulation process, which is the subroutine process, illustrated in FIG. 8 ends.

Figure 9:
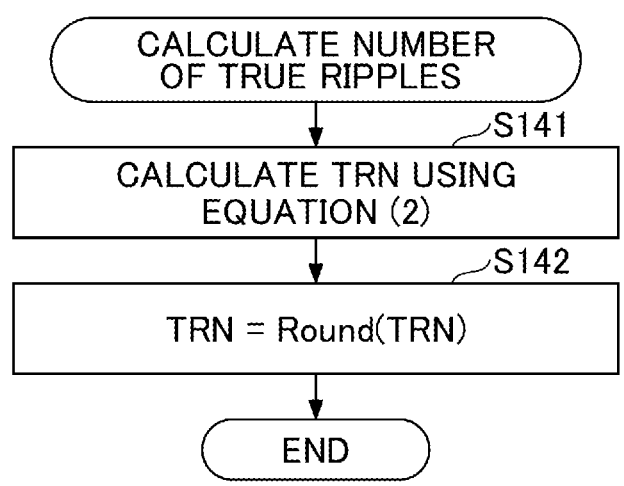
FIG. 9 is a flowchart illustrating an example of a process for calculating the estimated number of ripples.

Next, a process for calculating the estimated number of ripples TRN will be described with reference to FIG. 9. FIG. 9 is a flowchart illustrating an example of the process for calculating the estimated number of ripples TRN. The process illustrated in FIG. 9 is the subroutine process in step S9.

The rotation angle detector 133B calculates the estimated number of ripples TRN according to the equation (2) (step S141).

The rotation angle detector 133B calculates the estimated number of ripples TRN by performing a process for rounding the estimated number of ripples TRN obtained in step S141 (step S142). For example, the estimated number of ripples TRN is rounded to the nearest integer.

The process for calculating the estimated number of ripples TRN illustrated in FIG. 9 ends.

Figure 10:
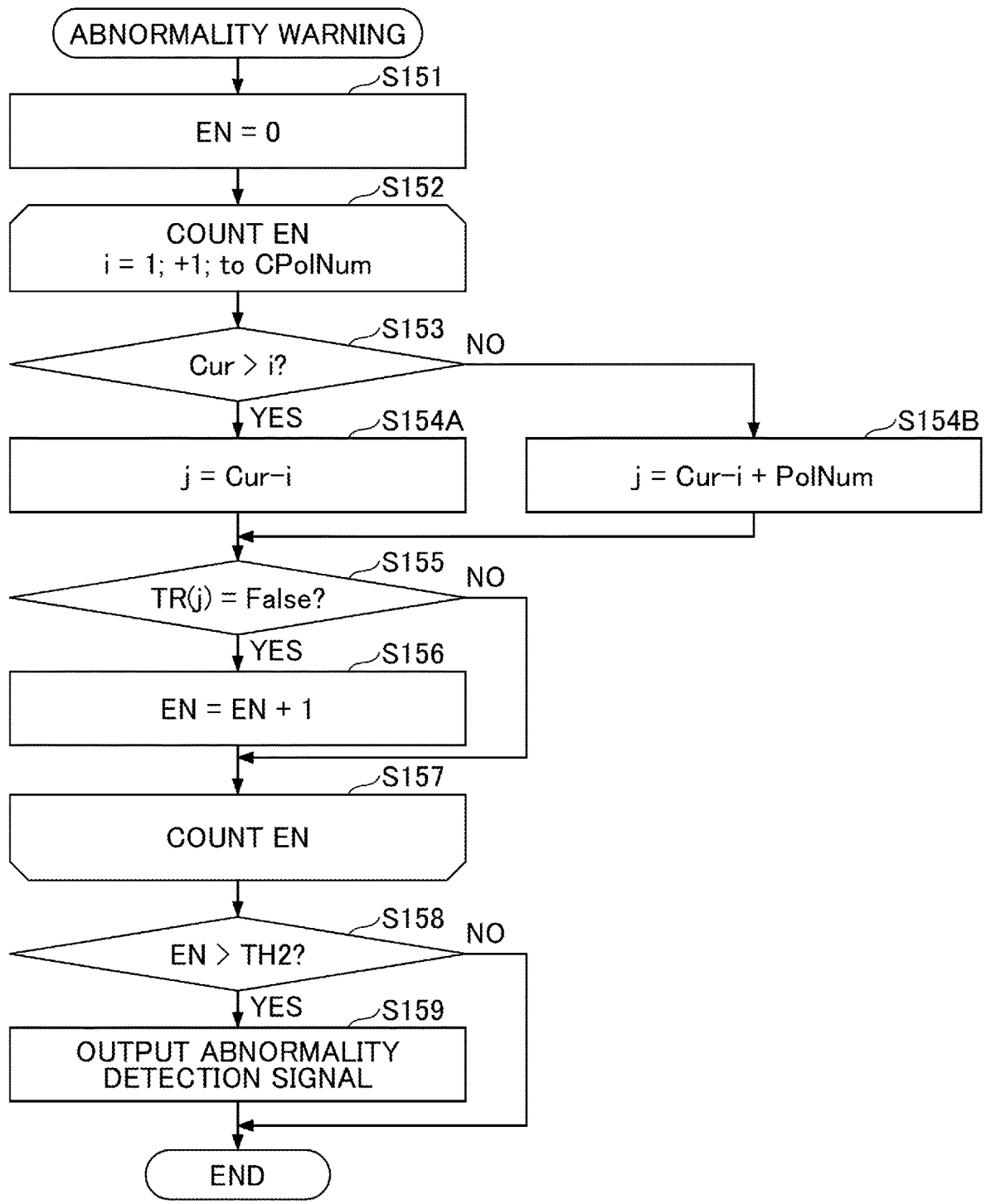
FIG. 10 is a flowchart illustrating an example of an abnormality warning process.

Next, the abnormality warning processing will be described with reference to FIG. 10. FIG. is a flowchart illustrating an example of the abnormality warning process. The process illustrated in FIG. 10 is the subroutine process in step S15.

The rotation angle detector 133B resets Error Number (EN), which represents the number of times that false detection or missed detection of a ripple has occurred during one rotation of the rotor of the DC motor 10, to zero (step S151).

The rotation angle detector 133B performs a loop process of steps S152 to S157 (step S152). The loop process uses a variable i that takes values of 1 to CPolNum. The loop process is repeated CPolNum times while changing the variable i from 1 to CPolNum, and the EN, representing the number of times that false detection or missed detection of a ripple has occurred, is counted. CPolNum is the number of slots in the DC motor 10 and is equivalent to the number of ripples obtained during one rotation of the rotor in a normal case. The term "normal case" means that there is no false detection or missed detection of a ripple.

If the rotation angle detector 133B determines whether Cur is greater than i (step S153). That is, the rotation angle detector 133B determines whether Cur>i.

If the rotation angle detector 133B determines that Cur is greater than i (YES in S153), the rotation angle detector 133B sets a value j to Cur−i (step S154A). That is, j=Cur−i. In FIG. 10, the process is performed by replacing Cur with the value j instead of using Cur as it is. When step S154A ends, the rotation angle detector 133B causes the flow to proceed to step S155.

When the rotation angle detector 133B determines that Cur is not greater than i in step S153 (NO in S153), the rotation angle detector 133B sets the value j to Cur−i+PolNum (step S154B). That is, j=Cur−i+PolNum. When step S154B ends, the rotation angle detector 133B causes the flow to proceed to step S155.

The rotation angle detector 133B determines whether a determination result TR(j) is False (step S155). That is, the rotation angle detector 133B determines whether TR(j)=False.

If the rotation angle detector 133B determines that TR(j) is False (YES in S155), the rotation angle detector 133B increments the EN (step S156). That is, EN=EN+1. When step S156 ends, the rotation angle detector 133B cause the flow to proceed to step S157.

When the rotation angle detector 133B determines that TR(j) is not False in step S155 (NO in S155), the rotation angle detector 133B cause the flow to proceed to step S157.

The rotation angle detector 133B repeats the loop process of steps S152 to S157 CPolNum times while changing the variable i from 1 to CPolNum. In this manner, the EN, representing the number of times that false detection or missed detection of a ripple has occurred during the rotation of the rotor of the DC motor 10 at a predetermined angle, is counted.

The rotation angle detector 133B determines whether the number of times EN obtained in the loop process of steps S152 to S157 is greater than a second threshold TH2 (step S158). As an example, the second threshold TH2 is half the value of CPolNum. That is, the rotation angle detector 133B determines whether the number of erroneously detected or undetected ripples during the rotation of the DC motor 10 at a predetermined angle is half or more of the number of ripples obtained in a normal case.

If the rotation angle detector 133B determines that the EN is greater than the second threshold TH2 (YES in S158), the rotation angle detector 133B outputs an abnormality detection signal (step S159). The abnormality detection signal is indicated to the ECU that controls the power window 50 of the vehicle.

When step S159 ends, the rotation angle detector 133B ends the abnormality warning process (END).

If the rotation angle detector 133B determines that the EN is not greater than the second threshold TH2 in step S158 (NO in S158), the rotation angle detector 133B ends the abnormality warning process (END).

As described above, even if false detection of a ripple or missed detection of a ripple occurs consecutively, the estimated number of ripples TRN can be calculated according to the equation (2), the number of correction ripples CRN can be calculated according to the equation (3), and the rotation angle of the DC motor 10 can be corrected.

Accordingly, the rotation angle detection device 100 and the rotation angle detection method, in which the rotation angle of the DC motor 10 can be correctly detected even if false detection of a ripple or missed detection of a ripple occurs consecutively, can be provided.

Further, the rotation angle detector 133B detects the rotation angle R of the DC motor 10 each time a ripple is detected by the ripple detector 122. Therefore, each time a ripple is detected, the rotation angle R of the DC motor 10 can be detected based on a detection result of the latest ripple.

The rotation angle detector 133B outputs an abnormality detection signal indicating an abnormality if the rotation angle detector 133B determines that the EN, representing the number of times that false detection or missed detection of a ripple has occurred during one rotation of the DC motor 10, is greater than the second threshold TH2. Therefore, an abnormality can be indicated when the EN is greater than the second threshold TH2.

Further, if the divergence obtained by dividing the absolute value of the difference between an observation period T(i) and an estimation period Te(i) by the estimation period Te(i) is less than or equal to the predetermined threshold, the rotation angle detector 133B determines that the observation period T is within the normal range. Therefore, whether or not the observation period T is within the normal range can be easily determined based on the divergence.

Further, the estimated number of ripples TRN during an abnormal period of time is a value obtained by dividing the sum of observation periods T(i) during the abnormal period of time by an average value of estimation periods Te(i) during the abnormal period of time. Therefore, even if false detection of a ripple or missed detection of a ripple occurs consecutively, the estimated number of ripples TRN during the abnormal period of time can be obtained with high accuracy. Accordingly, the rotation angle detection device 100 and the rotation angle detection method, in which the rotation angle of the DC motor 10 can be correctly detected, can be provided.

Further, the rotation angle detector 133B creates an array in which a predetermined number of consecutive observation periods T(i) are rearranged in order of length, and defines the median of the array as an estimation period Te(i). As a stable value can be obtained by using the median of the predetermined number of the past observation periods T(i), the estimation period Te(i) can be stably obtained by a simple process.

<Modification of Flowchart>

Figure 11A:
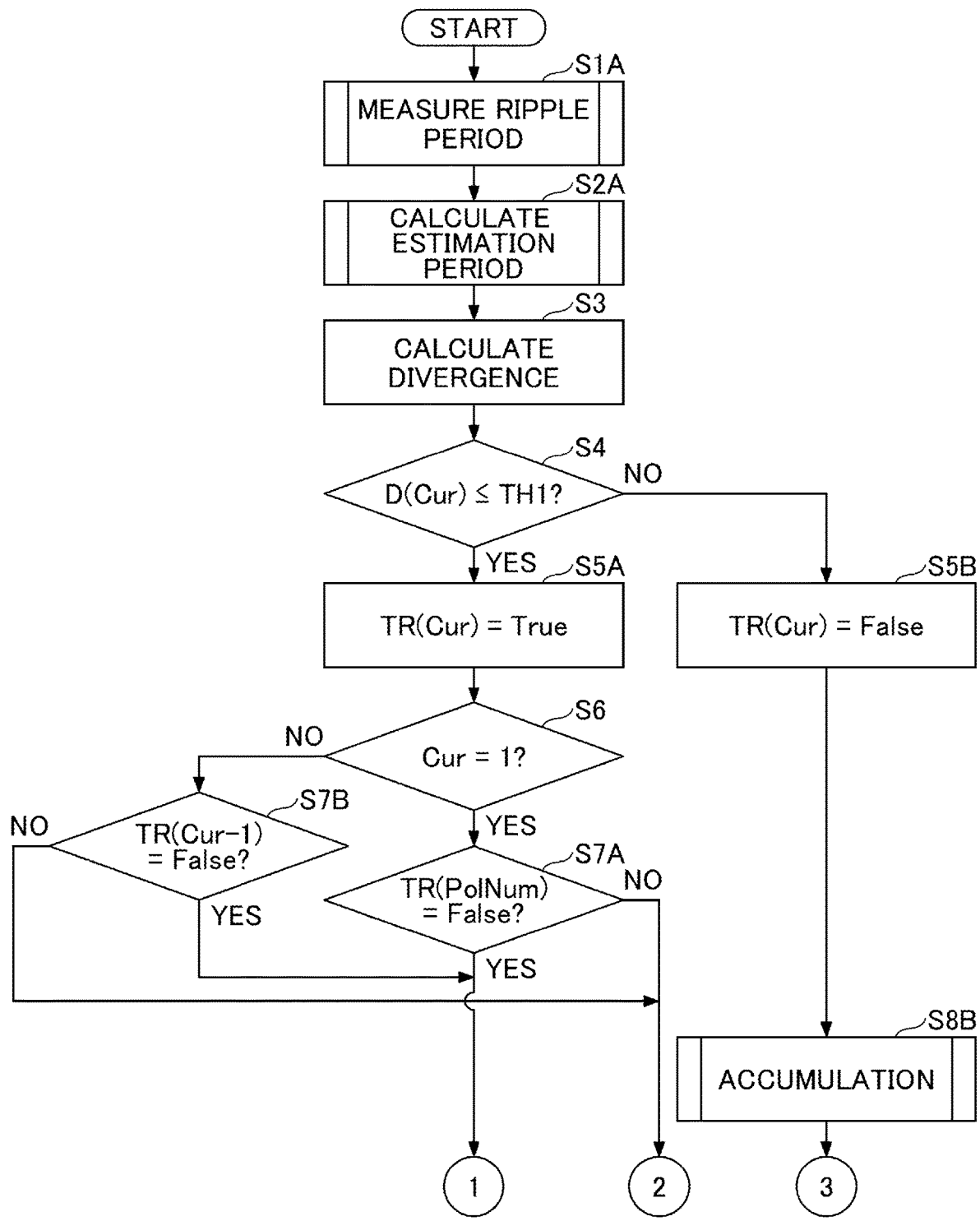
FIG. 11A is a flowchart illustrating an example of a process for detecting the rotation angle of the DC motor performed by the rotation angle detector according to a modification of the embodiment.
Figure 11B:
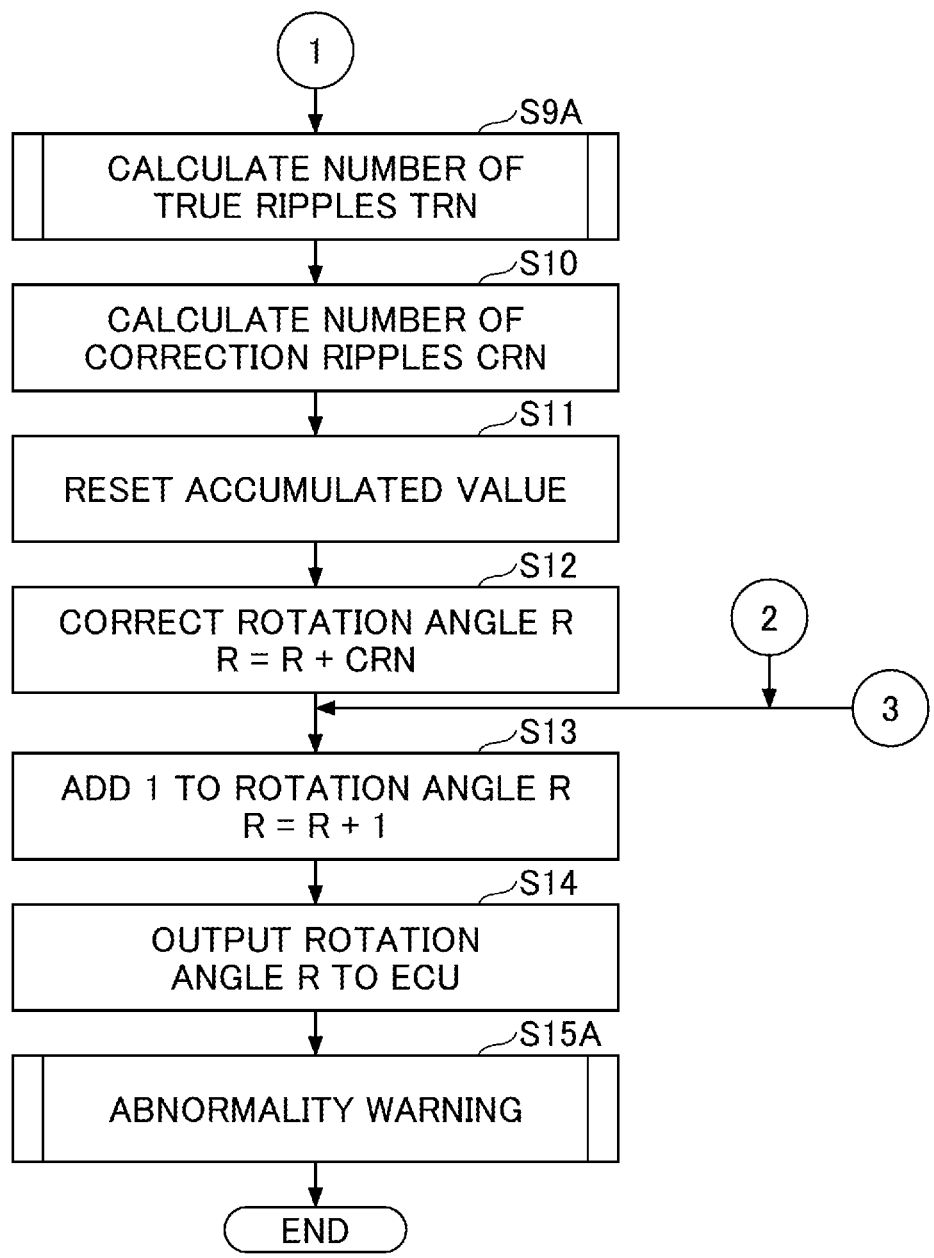
FIG. 11B is the flowchart illustrating the example of the process for detecting the rotation angle of the DC motor performed by the rotation angle detector according to the modification of the embodiment.

FIGS. 11A and 11B are a flowchart illustrating an example of a process for detecting the rotation angle of the DC motor 10 performed by the rotation angle detector 133B according to a modification of the embodiment. The rotation angle detector 133B repeatedly performs the process illustrated in FIGS. 11A and 11B for each period in which a ripple is detected.

In FIGS. 11A and 11B, steps the same as those in FIGS. 5A and 5B are denoted by the same step numbers, and the description thereof will be omitted. The process illustrated in FIGS. 11A and 11B does not include step S8A (see FIG. 5A), and includes steps S1A, S2A, S8C, S9A, and S15A instead 13 of steps S1, S2, S8B, S9, and S15 illustrated in FIGS. 5A and 5B. Subroutine processes in steps S1A, S2A, S8C, and S15A differ from those in FIGS. 5A and 5B, and will be described later in detail with reference to FIG. 12, FIG. 13, FIG. 14, and FIG. 15. In order to mainly describe differences between FIGS. 11A and 11B versus FIGS. 5A and 5B, a description will be given from step S9A.

If the answer in step S7A or S7B is YES, the rotation angle detector 133B calculates the estimated number of ripples TRN (step S9A). According to the modification, the rotation angle detector 133B calculates the estimated number of ripples TRN in step S9 without performing the accumulation process of step S8A (see FIG. 5A) after determining that the answer is YES in step S7A or S7B. According to the modification, the correction is performed based only on observation periods outside the normal range. As compared to the example of FIG. 5A, both the estimated number of ripples and the number of ripples SN during an abnormal period of time decrease by one. Thus, the number of correction ripples CRN is the same as that of the example illustrated in FIG. 5A. The number of correction ripples CRN can be correctly calculated as long as periods of time corresponding to the estimated number of ripples TRN in the equation coincide with periods of time corresponding to the number of ripples SN during an abnormal period of time. In the example illustrated in FIG. 5A, the accuracy is increased by using both an abnormal period of time and an observation period that is determined to be within the normal range for the first time after the abnormal period of time.

In step S9A, the estimated number of ripples TRN is calculated by dividing the accumulated value ΣT of observation periods T(i) during an abnormal period of time by an estimation period Te(i). As the estimation period Te(i), the value estimated in step S2A in the current control period is used. Step S9A is a subroutine process, and details will be described later with reference to FIG. 15.

When step S9A ends, the rotation angle detector 133B causes the flow to proceed to step S10.

Figure 12:
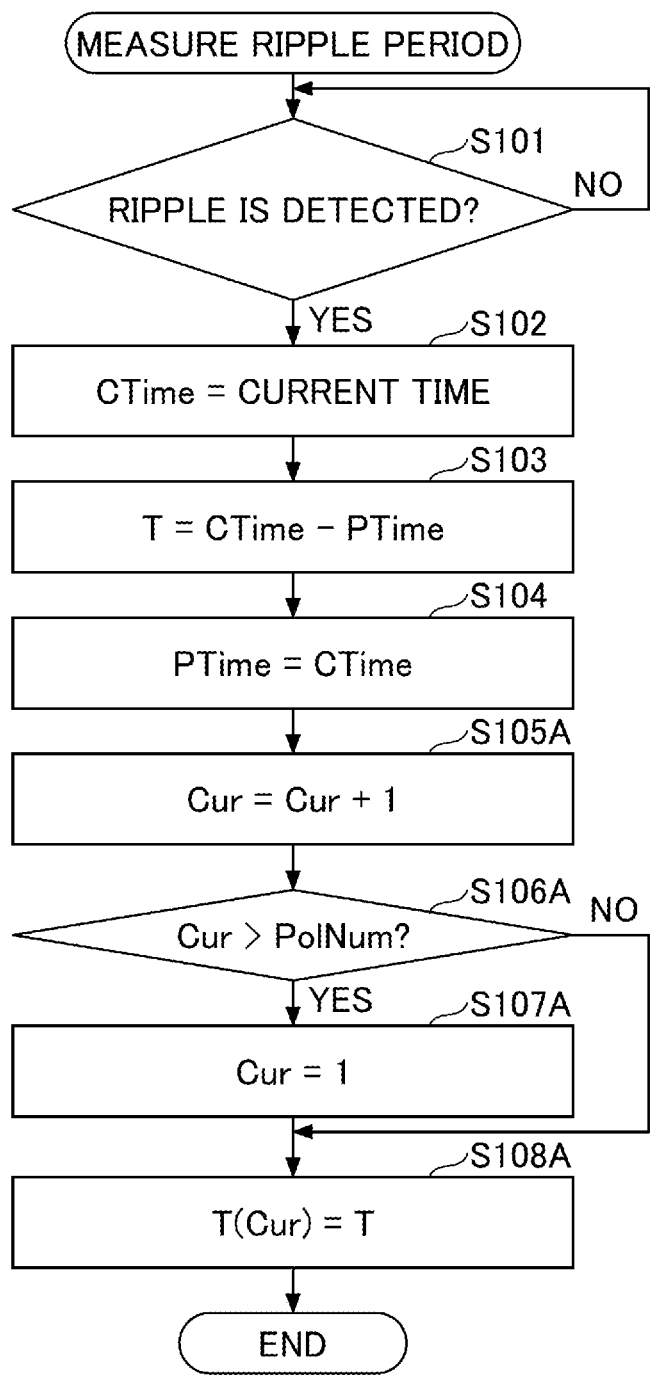
FIG. 12 is a flowchart illustrating an example of a ripple period measurement process according to the modification.

Next, a ripple period measurement process according to the modification will be described with reference to FIG. 12. FIG. 12 is a flowchart illustrating an example of the ripple period measurement process according to the modification. Steps S101 to S104 illustrated in FIG. 12 are the same as steps S101 to S104 illustrated in FIG. 6. The process illustrated in FIG. 12 differs from the process illustrated in FIG. 6 in steps S105A to S108A. In order to mainly describe differences between FIG. 12 and FIG. 6, a description will be given from step S105A.

When step S104 ends, the rotation angle detector 133B increments Cur (step S105A). That is, Cur=Cur+1.

The rotation angle detector 133B determines whether Cur is greater than PolNum (step S106A). That is, the rotation angle detector 133B determines whether Cur>PolNum.

If the rotation angle detector 133B determines that Cur is greater than PolNum (YES in S106A), the rotation angle detector 133B sets Cur to 1 (step S107A). That is, Cur=1.

The rotation angle detector 133B sets an observation period T(Cur) to the latest observation period T (step S108A). That is, T(Cur)=T.

If the rotation angle detector 133B determines that Cur is not greater than PolNum in step S106A (NO in S106A), the rotation angle detector 133B causes the flow to proceed to step S108A.

The ripple period measurement process according to the modification ends.

Figure 13:
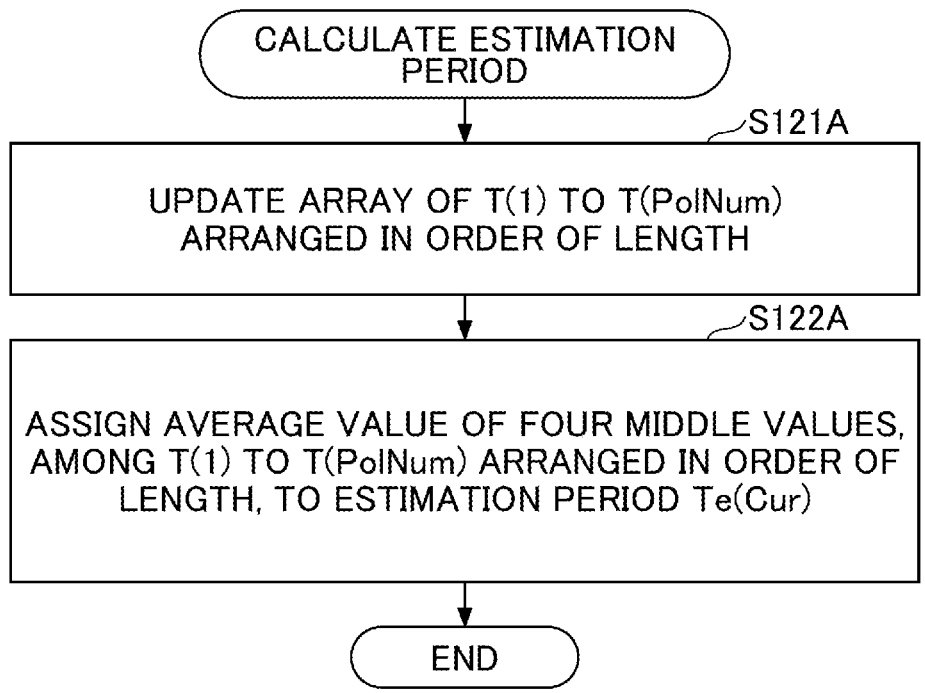
FIG. 13 is a flowchart illustrating an example of an estimation period calculation process according to the modification.

Next, an estimation period calculation process will be described with reference to FIG. 13 according to a modification. FIG. 13 is a flowchart illustrating an example of the estimation period calculation process according to the modification.

The rotation angle detector 133B updates an array of observation periods T(1) to T(PolNum) arranged in order of length (step S121A). The observation periods T(1) to T(PolNum) correspond to one rotation of the DC motor 10. The PolNum number of observation periods T is included in the array. The PolNum number is an example of a first predetermined number.

The observation period T(Cur), among the observation periods T(1) to (PolNum) before update, is overwritten by the latest value in step S108A. The other observation periods T(i) are rearranged in order of length (in descending order) during the previous process. In step S121A, the rotation angle detector 133B changes the order of the latest observation period T(Cur), and rearrange the observation periods T(i) in order of length. Note that, in the present modification, it is only necessary to know whether four observation periods T(i) of the eight observation periods T(i) are located in the middle or located at either end. In addition, except for the first time, it is known whether the seven observation periods T(i) other than the latest observation period T(Cur) correspond to any of the first and second longest observation periods, four middle observation periods (the third to sixth longest observation periods), and the seventh and eighth longest observation periods based on the previous process. For this reason, the four middle observation periods T(i) may be identified without rearranging the observation periods T(i) in order of length. The first and second longest observation periods T(i) in the previous process are set as tentative first and second longest observation periods T(i). Similarly, the seventh and eighth longest observation periods in the previous process are set as tentative seventh and eighth longest observation periods. If the oldest observation period T(i), which is overwritten by the latest observation period T(Cur), is the first or second longest observation period in the previous process, the longest observation period T(i), from among the third to sixth longest observation periods T(i) in previous process, is set as a tentative first or second observation period T(i). Similarly, if the oldest observation period T(i), which is overwritten by the latest observation period T(Cur), is the seventh or eighth longest observation period in the previous process, the smallest observation period T(i), from among the third to sixth longest observation periods T(i) in the previous process, is set as a tentative seventh or eighth observation period T(i). Then, the latest observation period T(Cur) is compared with the tentative first and second observation periods T(i), and the first and second longest observation periods T(i) are determined. If the latest observation period T(Cur) is shorter than the tentative first and second observation periods T(i), the latest observation period T(Cur) is compared with the tentative seventh and eighth observation period T(i), and the seventh to eighth longest observation periods T(i) are determined.

The rotation angle detector 133B assigns an average value of four middle values, among the observation periods T(1) to T(PolNum) arranged in order of length, to an estimation period Te(Cur) (step S122A). The four middle values are values of four middle observation periods T among the PolNum number of (eight, for example) observation periods T, from which the first and second shortest observation periods T and the first and second longest observation periods T are excluded. The number of the first and second shortest or longest observation periods (that is, two) is an example of a second predetermined number, which is less than the first predetermined number, and the number of the middle observation periods (that is, four) is an example of a third predetermined number. Note that the number of middle values is not limited to 4, and an average value of a plurality of values including the median of an array of, for example, eight observation periods T arranged in order of length may be used.

The estimation period calculation process, which is the subroutine process, according to the modification illustrated in FIG. 13 ends.

Figure 14:
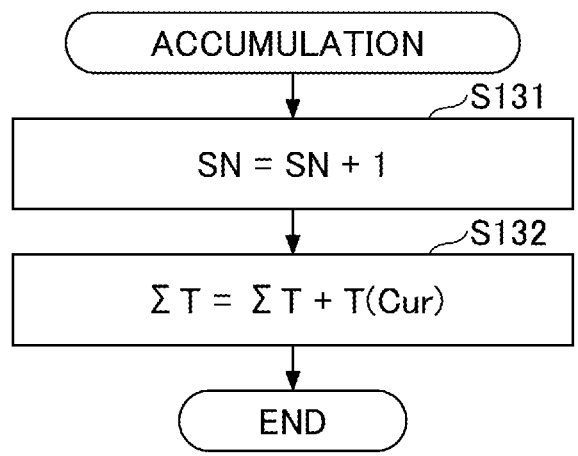
FIG. 14 is a flowchart illustrating an example of an accumulation process according to the modification.

Next, an accumulation process according to the modification will be described with reference to FIG. 14. FIG. 14 is a flowchart illustrating an example of the accumulation process according to the modification. The accumulation process illustrated in FIG. 14 is a subroutine process of step S8B of FIG. 11A.

The rotation angle detector 133B increments SN (step S131). That is, SN=SN+1. The SN represents the number of ripples detected during an abnormal period of time.

The rotation angle detector 133B adds the latest observation period T(Cur) to the accumulated value ΣT of observation periods T(i) (step S132). That is, ΣT=ΣT+T(Cur). According to the modification, the accumulated value ΣTe of estimation periods Te(i) during the abnormal period of time is not obtained, and only steps S131 and S132 the same as those of FIG. 8 are performed in the accumulation process according to the modification.

The accumulation process, which is the subroutine process, illustrated in FIG. 14 according to the modification ends. The accumulation process, which is the subroutine process, according to the modification, does not include step S133 of FIG. 8 for calculating the accumulated value ΣTe of estimation periods Te(i). In the example illustrated in FIG. 8, since an average value of estimation periods is used, the accumulated value of the estimation periods is calculated. In the example illustrated in FIG. 14, the latest estimation period is used to simplify the process.

Figure 15:
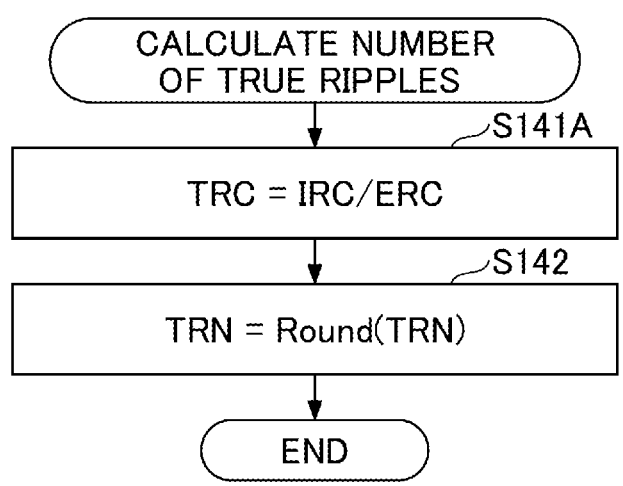
FIG. 15 is a flowchart illustrating an example of a process for calculating the estimated number of ripples according to the modification.

Next, a process for calculating the estimated number of ripples TRN according to the modification will be described with reference to FIG. 15. FIG. 15 is a flowchart illustrating an example of the process for calculating the estimated number of ripples TRN according to the modification. The process illustrated in FIG. 15 is a subroutine process of step S9 of FIG. 11B, and includes step S141A instead of step S141 of FIG. 9.

The rotation angle detector 133B calculates the estimated number of ripples TRN by dividing the accumulated value ΣT of observation periods T(i) by the latest estimation period Te(i) (step S141A). That is, TRN=ΣT(i)/Te.

When step S141A ends, the rotation angle detector 133B causes the process to proceed to step S142.

The process for calculating the estimated number of ripples TRN illustrated in FIG. 15 ends.

Figure 16:
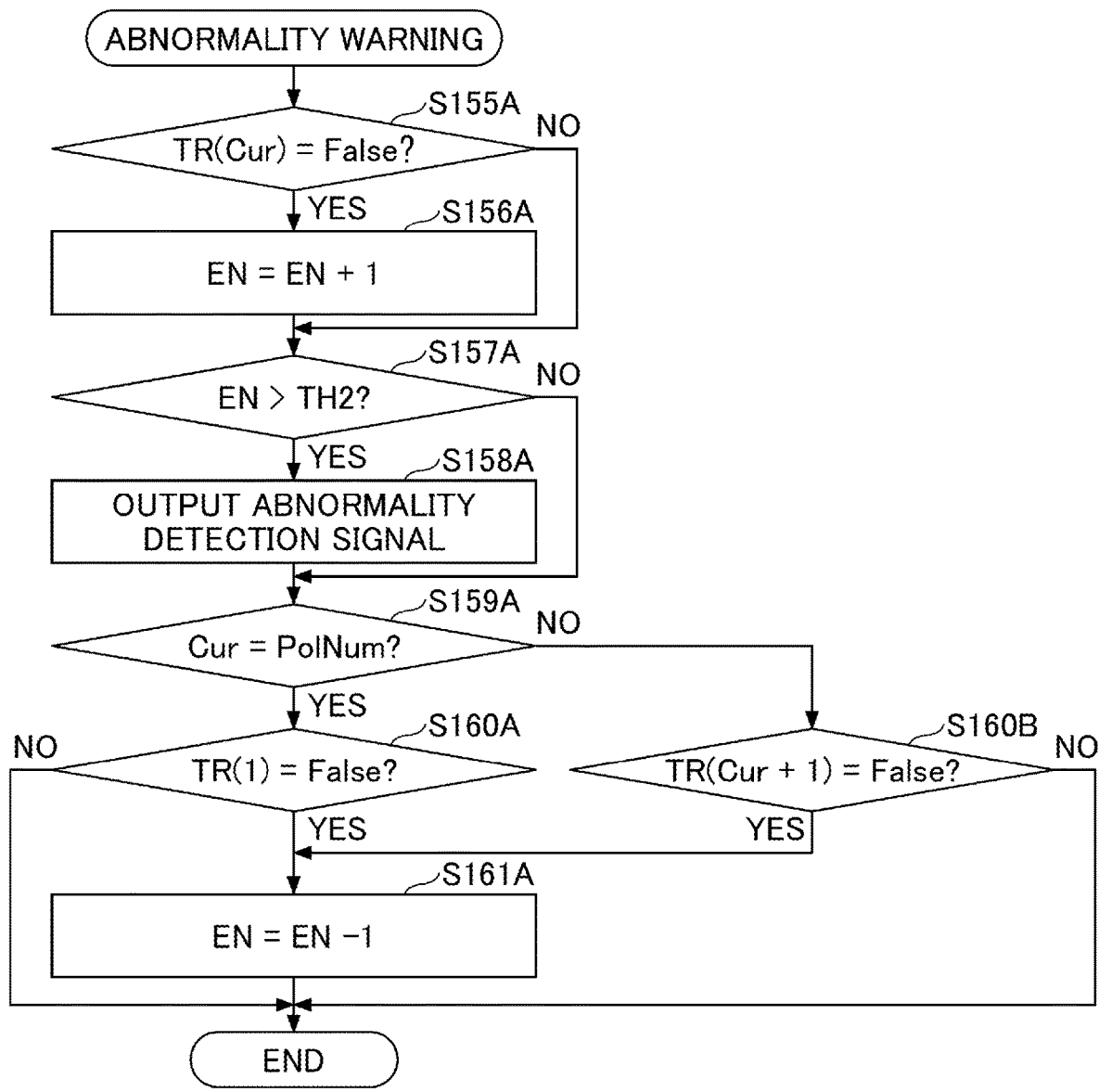
FIG. 16 is a flowchart illustrating an example of an abnormality warning process according to the modification.

Next, an abnormality warning process according to a modification will be described with reference to FIG. 16. FIG. 16 is a flowchart illustrating an example of the abnormality warning process according to the modification. The process illustrated in FIG. 16 is a subroutine process of step S15 of FIG. 11B, and is entirely different from the process illustrated in FIG. 10.

The rotation angle detector 133B determines whether the latest determination result TR(Cur) is False (step S155A). That is, the rotation angle detector 133B determines whether the determination result TR (Cur)=False.

If the rotation angle detector 133B determines that the determination result TR(Cur) is False (YES in S155A), the rotation angle detector 133B increments EN, which represents the number of times that false detection or missed detection of a ripple has occurred during one rotation of the rotor of the DC motor 10 (step S156A).

The rotation angle detector 133B determines whether the number of times EN is greater than the second threshold TH2 (step S157A).

If the rotation angle detector 133B determines that the number of times EN is greater than the second threshold TH2 (YES in S157A), the rotation angle detector 133B outputs an abnormality detection signal (step S158A). The abnormality detection signal is indicated to the ECU that controls the power window 50 of the vehicle. When step S158A ends, the rotation angle detector 133B causes the flow to proceed to step S159A. If the rotation angle detector 133B determines that the number of times EN is not greater than the second threshold TH2 in step S157A (NO in S157A), the rotation angle detector 133B causes the flow to proceed to step S159A.

The rotation angle detector 133B determines whether Cur is equal to PolNum (step S159A). That is, the rotation angle detector 133B determines whether Cur=PolNum.

If the rotation angle detector 133B determines that Cur is equal to PolNum (YES in S159A), the rotation angle detector 133B determines whether a determination result TR(1) is False (step S160A). That is, the rotation angle detector 133B determines whether the determination result TR(1)=False. The determination result TR(1) is a determination result TR(Cur) with Cur of 1, and is a determination result TR of the oldest generation. If the determination result TR of the oldest generation is False, it is necessary to subtract a count of the false determination result TR in preparation for the next control period. Therefore, in step S160A, the rotation angle detector 133B determines whether the determination result TR(1) is False.

If the rotation angle detector 133B determines that the determination result TR(1) is False (YES in S160A), the rotation angle detector 133B causes the flow to proceed to step S161A.

If the rotation angle detector 133B determines that Cur is not equal to PolNum in step S159A (NO in S159A), the rotation angle detector 133B determines whether a determination result TR(Cur+1) is False (step S160B). That is, the rotation angle detector 133B determines whether the determination result TR(Cur+1)=False. Since the generation Cur is the latest generation, the generation Cur+1 is the oldest generation, and determination result TR(Cur+1) is a determination result TR of the oldest generation. If the determination result TR of the oldest generation is False, it is necessary to subtract a count of the false determination result TR in preparation for the next control period. Therefore, in step S160B, the rotation angle detector 133B determines whether the determination result TR(Cur+1) is False.

If the rotation angle detector 133B determines that the determination result TR(Cur+1) is False (YES in S160B), the rotation angle detector 133B cause the flow to proceed to step S161A.

The rotation angle detector 133B decrements the EN, which represents the number of times that false detection or missed detection of a ripple has occurred during one rotation of the rotor of the DC motor 10 (step S161A). That is, EN=EN−1. If the determination result TR of the oldest generation is False, a count of the false judgment result TR of the oldest generation is subtracted in preparation for the next control period.

When step S161A ends, the rotation angle detector 133B ends the abnormality warning process (END).

If the rotation angle detector 133B determines that the determination result TR(1) is not False in step S160A (NO in S160A) or if the rotation angle detector 133B determines that the determination result TR(Cur+1) is not False in step S160B (NO in S160B), the rotation angle detector 133B ends the abnormality warning process (END). This is because the EN is not required to be decremented if the false judgment result TR of the oldest generation is not False.

As described above, even if false detection of a ripple or missed detection of a ripple occurs consecutively, the estimated number of ripples TRN can be calculated according to the equation (2), the number of correction ripples CRN can be calculated according to the equation (3), and the rotation angle of the DC motor 10 can be corrected.

Therefore, according to the modification, a rotation angle detection device 100 and a rotation angle detection method, in which the rotation angle of the DC motor 10 can be correctly detected even if false detection of a ripple or missed detection of a ripple occurs consecutively, can be provided.

In the process illustrated in FIG. 12 according to the modification of the embodiment, the generation Pol (see FIG. 6) is not used, and thus, the calculation is simplified and the process can be performed faster.

In the process for calculating an estimation period Te(i) illustrated in FIG. 13 according to the modification of the embodiment, the rotation angle detector 133B creates an array in which a first predetermined number of consecutive observation periods T(i) are rearranged in order of length. Then, the rotation angle detector 133B excludes a second predetermined number of the shortest observation periods T and the second predetermined number of the longest observation periods T among the first predetermined number of observation periods T(i) included in the array, and defines an average value of a third predetermined number of middle observation periods T as an estimation period Te. The second predetermined number is less than the first predetermined number. Accordingly, the estimation period Te(i) can be calculated with high accuracy even if an error is included in any of the observation periods T(i).

Further, the accumulation process illustrated in FIG. 14 according to the modification does not include step S133 for calculating the accumulated value ΣTe of estimation periods Te(i) illustrated in FIG. 7. Therefore the calculation can be simplified.

Further, in the process for calculating the estimated number of ripples TRN illustrated in FIG. 15 according to the modification, the latest estimation period Te(i) is used without using an average value of estimation periods Te(i). Therefore the calculation can be simplified.

Further, the abnormality warning process illustrated in FIG. 16 according to the modification does not include a loop process. Therefore the calculation can be simplified.

According to an aspect of the present disclosure, a rotation angle detection device and a rotation angle detection method, in which the rotation angle of a direct current motor can be correctly detected even if false detection of a ripple or missed detection of a ripple occurs consecutively, can be provided.

Although examples of the rotation angle detection devices and the rotation angle detection methods according to the embodiments of the present disclosure have been described above, the present disclosure is not limited to the specifically disclosed embodiments, and various modifications and variations may be made without departing from the scope of the present invention.

What is claimed is:
1. A rotation angle detection device comprising:
a current meter configured to measure a current flowing in a direct current motor;
a filter configured to extract a ripple component from the current;
a ripple detector configured to detect a ripple from a signal that has passed through the filter; and
a rotation angle detector configured to detect a rotation angle of the direct current motor based on a number of ripples detected by the ripple detector,
wherein the rotation angle detector
measures an observation period based on consecutive ripples detected by the ripple detector, the observation period being a period of time between the consecutive ripples,
calculates, as an estimation period, a true period between the consecutive ripples based on the observation period,
determines whether the observation period is within a normal range based on the estimation period and the observation period, and
in response to determining that the observation period is within the normal range and an immediately-previous observation period is outside the normal range, calculates a number of correction ripples CRN so as to correct the number of the ripples based on an equation (1) below,

$$CRN = TRN - SN \quad (1)$$

in which TRN is a value obtained by dividing a sum of observation periods during an abnormal period of time, in which the observation periods are consecutively determined to be outside the normal range, by the estimation period so as to obtain the TRN as an estimated number of ripples during the abnormal period of time, and SN is a number of ripples detected by the ripple detector during the abnormal period of time in which the observation periods are consecutively determined to be outside the normal range.

2. The rotation angle detection device according to claim 1, wherein the rotation angle detector detects the rotation angle of the direct current motor each time the ripple is detected by the ripple detector.

3. The rotation angle detection device according to claim 1, wherein the rotation angle detector outputs an abnormality signal, indicating an abnormality, in a case where a number of times that false detection or missed detection of a ripple has occurred during one rotation of the direct current motor is greater than a predetermined number.

4. The rotation angle detection device according to claim 1, wherein the rotation angle detector determines that the observation period is within the normal range in a case where a divergence obtained by dividing an absolute value of a difference between the observation period and the estimation period by the estimation period is less than or equal to a predetermined threshold.

5. The rotation angle detection device according to claim 1, wherein the TRN, indicating the estimated number of the ripples during the abnormal period of time, is a value obtained by dividing the sum of the observation periods during the abnormal period of time by an average value of estimation periods during the abnormal period of time.

6. The rotation angle detection device according to claim 1, wherein the rotation angle detector creates an array in which a predetermined number of consecutive observation periods are rearranged in order of length, and defines a median of the array as the estimation period.

7. The rotation angle detection device according to claim 1, wherein the rotation angle detector creates an array in which a first predetermined number of consecutive observation periods are rearranged in order of length, excludes a second predetermined number of shortest observation periods and the second predetermined number of longest observation periods among the first predetermined number of the observation periods included in the array, and defines an average value of a third predetermined number of remaining middle observation periods as the estimation period, the second predetermined number being less than the first predetermined number.

8. A rotation angle detection method comprising:
   a current measuring process of measuring a current flowing in a direct current motor;
   a filtering process of extracting a ripple component from the current;
   a ripple detecting process of detecting a ripple from a signal obtained by the filtering process; and
   a rotation angle detecting process of detecting a rotation angle of the direct current motor based on a number of ripples detected by the ripple detecting process,
   wherein the rotation angle detecting process includes
      measuring an observation period based on consecutive ripples detected by the ripple detecting process, the observation period being a period of time between the consecutive ripples,
      calculating, as an estimation period, a true period between the consecutive ripples based on the observation period,
      determining whether the observation period is within a normal range based on the estimation period and the observation period,
      in response to determining that the observation period is within the normal range and an immediately-previous observation period is outside the normal range, calculating a number of correction ripples CRN based on an equation (2) below, $$CRN = TRN - SN \qquad (2)$$

in which TRN is a value obtained by dividing a sum of observation periods during an abnormal period of time, in which the observation periods are consecutively determined to be outside the normal range, by the estimation period so as to obtain the TRN as an estimated number of ripples during the abnormal period of time, and SN is a number of ripples detected by the ripple detecting process during the abnormal period of time in which the observation periods are consecutively determined to be outside the normal range, and
   correcting the number of the ripples based on the calculated CRN, thereby detecting the rotation angle of the direct current motor.

* * * * *